(12) United States Patent
Kasugai

(10) Patent No.: US 11,258,940 B2
(45) Date of Patent: Feb. 22, 2022

(54) IMAGING APPARATUS

(71) Applicant: Panasonic Intellectual Property Management Co., Ltd., Osaka (JP)

(72) Inventor: Hiroki Kasugai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/150,283

(22) Filed: Jan. 15, 2021

(65) Prior Publication Data
US 2021/0227145 A1 Jul. 22, 2021

(30) Foreign Application Priority Data
Jan. 20, 2020 (JP) .............................. JP2020-006969

(51) Int. Cl.
*H04N 5/232* (2006.01)

(52) U.S. Cl.
CPC ... *H04N 5/232121* (2018.08); *H04N 5/23219* (2013.01); *H04N 5/23245* (2013.01); *H04N 5/232127* (2018.08)

(58) Field of Classification Search
CPC ............. H04N 5/232; H04N 5/232121; H04N 5/232127; H04N 5/23219; H04N 5/23245; H04N 5/232125; H04R 3/00
USPC ........................................................ 348/348
See application file for complete search history.

(56) References Cited

U.S. PATENT DOCUMENTS

| | | | | |
|---|---|---|---|---|
| 9,247,192 B2 * | 1/2016 | Lee | ...................... | H04N 9/8211 |
| 9,460,531 B2 * | 10/2016 | Nakayama | ............... | H04N 5/60 |
| 9,860,439 B2 * | 1/2018 | Sawa | .................. | H04N 5/23206 |
| 9,912,907 B2 * | 3/2018 | De Magalhaes | ... | H04N 5/23212 |
| 10,027,888 B1 * | 7/2018 | Mackraz | .............. | H04N 13/383 |
| 10,778,900 B2 * | 9/2020 | Kelly | ................. | G06K 9/00315 |
| 11,049,519 B2 * | 6/2021 | Moon | .............. | G11B 20/10527 |
| 11,120,818 B2 * | 9/2021 | Magnusson | ............. | G10L 25/75 |
| 11,127,415 B2 * | 9/2021 | Magnusson | ............. | G10L 25/75 |
| 2009/0066798 A1 | 3/2009 | Oku | | |

(Continued)

FOREIGN PATENT DOCUMENTS

| | | |
|---|---|---|
| JP | 2009-156888 A | 7/2009 |
| JP | 2010-093603 A | 4/2010 |
| JP | 2010-283706 A | 12/2010 |

*Primary Examiner* — Pritham D Prabhakher

(74) *Attorney, Agent, or Firm* — Renner, Otto, Boisselle & Sklar, LLP

(57) ABSTRACT

An imaging apparatus comprising: a display configured to display information; an image sensor configured to capture an image of a subject to generate image data; an audio input device configured to input audio to generate an audio signal indicating sound to be collected during image capturing with the image sensor; a detector configured to detect a subject region which corresponds to the subject in the image data; a controller configured to determine a main subject and a sound collection target for the audio signal, according to a subject region detected by the detector. When the detector detects a plurality of subject regions, the controller controls the display to display first identification information indicating a subject which is the main subject and is the sound collection target and second identification information indicating a subject which is different from the main subject and is the sound collection target distinguishably from each other.

19 Claims, 22 Drawing Sheets

(56) References Cited

U.S. PATENT DOCUMENTS

| | | | | |
|---|---|---|---|---|
| 2010/0123785 A1* | 5/2010 | Chen | ............... | H04R 3/005 |
| | | | | 348/207.11 |
| 2011/0052139 A1* | 3/2011 | Oku | ............... | H04N 5/23218 |
| | | | | 386/224 |
| 2011/0085061 A1* | 4/2011 | Kim | ............... | H04N 5/23219 |
| | | | | 348/240.99 |
| 2011/0317023 A1* | 12/2011 | Tsuda | ............... | H04R 1/406 |
| | | | | 348/207.99 |
| 2013/0226593 A1* | 8/2013 | Magnusson | ............... | H04N 5/765 |
| | | | | 704/276 |
| 2014/0253763 A1* | 9/2014 | Kaneaki | ............... | H04N 5/23219 |
| | | | | 348/240.99 |
| 2016/0173821 A1* | 6/2016 | De Magalhaes | ... | G06K 9/00718 |
| | | | | 348/14.08 |
| 2018/0070008 A1* | 3/2018 | Tyagi | ............... | G10L 17/00 |

* cited by examiner

Fig. 11A

| SOUND COLLECTION TARGET | R1, R3 |
|---|---|
| SOUND COLLECTION AREA | FRONT CENTER SOUND COLLECTION AREA |
| HORIZONTAL ANGLE OF VIEW | 70° |
| FOCUSING DISTANCE | 1m |

Fig. 11B

| SOUND COLLECTION TARGET | R1 R2 |
|---|---|
| SOUND COLLECTION AREA | LEFT HALF SOUND COLLECTION AREA |
| HORIZONTAL ANGLE OF VIEW | 70° |
| FOCUSING DISTANCE | 1 5m |

IMAGING APPARATUS

BACKGROUND

1. Technical Field

The present disclosure relates to an imaging apparatus that captures an image while acquiring sound.

2. Related Art

JP 2010-283706 A discloses a video camera having a face detection function. The video camera of JP 2010-283706 A changes a directivity angle of a microphone in accordance with a zoom ratio, and a size of a face of a person in a captured screen. Thus, the video camera controls the directivity angle of the microphone associating with a distance between the video camera and a subject image, and thereby aims to realize control of changing the directivity angle of the microphone so that a voice of a subject can be captured more reliably while matching video and audio. The video camera detects a position and the size of the face of the person (subject), displays a frame (face detection frame) on the detected face area, and uses information on the size of the face detection frame (size of the face).

SUMMARY

The present disclosure provides an imaging apparatuses that capture an image while acquiring sound, wherein the imaging apparatus allows a user to easily check a subject from which the user intends to collect sound.

In the present disclosure, the imaging apparatus includes a display, an image sensor, an audio input device, a detector, and a controller. The display is configured to display information. The image sensor is configured to capture an image of a subject to generate image data. The audio input device is configured to acquire an audio signal indicating sound to be collected during image capturing by the image sensor. The detector is configured to detect a subject region corresponding to the subject in the image data. The controller is configured to determine a main subject and a sound collection target for the audio signal, according to a subject region detected by the detector. When a plurality of subject regions are detected by the detector, the controller controls the display to display first identification information and second identification information distinguishably from each other. The first identification information indicates a subject which is the main subject and is the sound collection target. The second identification information indicates a subject which is different from the main subject and is the sound collection target.

According to the imaging apparatus of the present disclosure, the subject of the sound collection target is determined according to the detected subject region in the image data based on the detection result of the detector, and is displayed in distinction from other subjects. This makes it possible for the user to easily check the subject whose sound is intended to be collected.

BRIEF DESCRIPTION OF THE DRAWINGS

FIGS. 11A and 11B are diagrams for illustrating management information obtained by the determination processing of a sound collection area;

DETAILED DESCRIPTION

Hereinafter, embodiments will be described in detail with reference to the drawings as appropriate. However, detailed description may be omitted more than necessary. For example, detailed descriptions of already well-known matters and duplicated descriptions for substantially identical configurations may be omitted. This is to avoid unnecessary redundancy of the following description and to facilitate understanding by those skilled in the art. The inventor(s) provides the accompanying drawings and the following description for those skilled in the art to fully understand the present disclosure, and does not intend them to limit the subject matter described in the scope of claims.

First Embodiment

In a first embodiment, as an example of an imaging apparatus according to the present disclosure, a digital camera will be described that detects a subject based on image recognition technique, controls a sound collection area according to a size of the detected subject, and controls a sound collection gain that emphasizes sound to be collected.

1-1. Configuration

Figure 1:
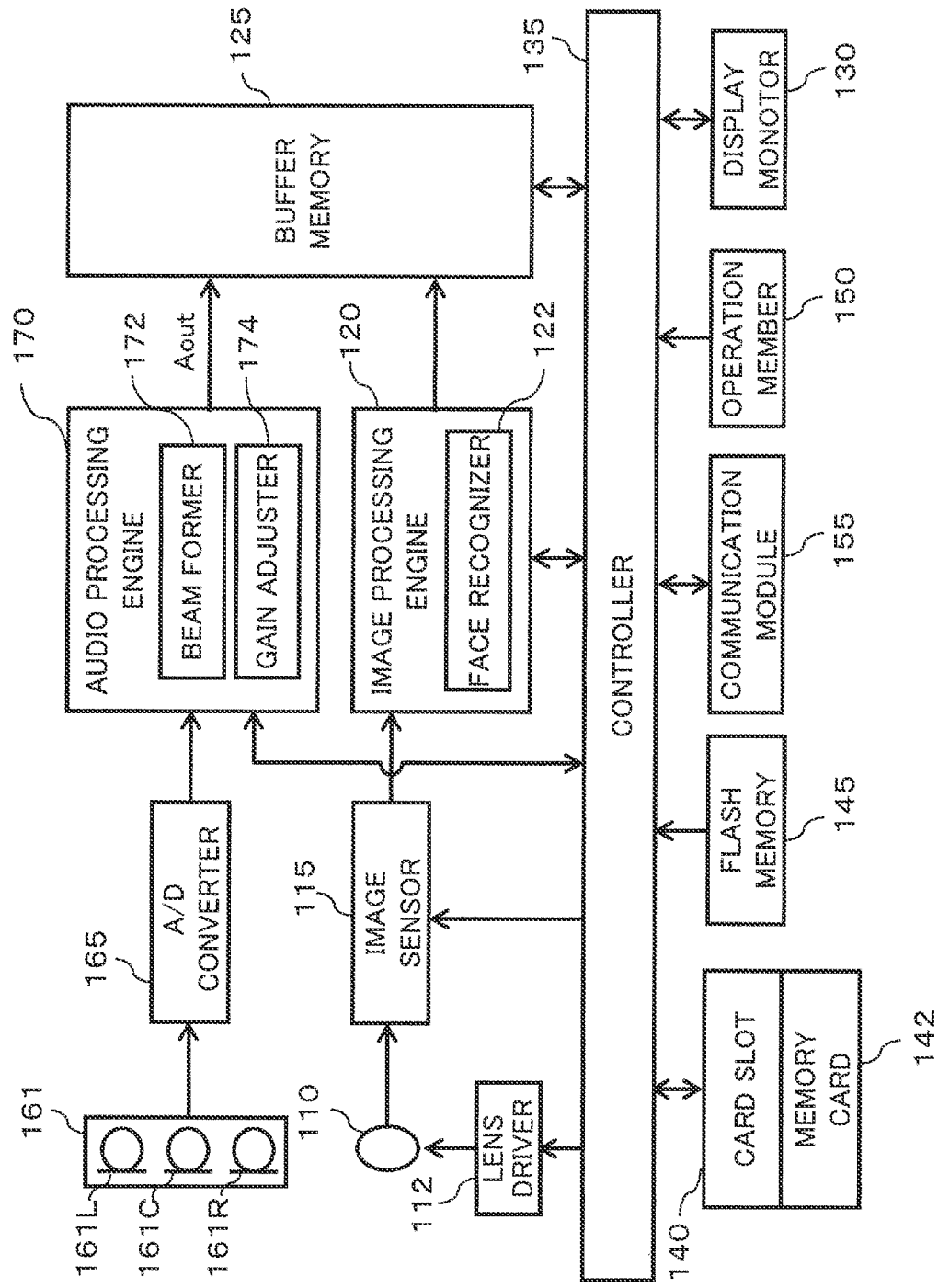
FIG. 1 is a diagram illustrating a configuration of a digital camera 100 according to a first embodiment of the present disclosure.

FIG. 1 is a diagram illustrating a configuration of a digital camera 100 according to the present embodiment. The digital camera 100 of the present embodiment includes an image sensor 115, an image processing engine 120, a display monitor 130, and a controller 135. Furthermore, the digital camera 100 includes a buffer memory 125, a card slot 140, a flash memory 145, an operation member 150, and a communication module 155. In addition, the digital camera 100 includes a microphone 161, an analog/digital (A/D) converter 165 for the microphone, and an audio processing engine 170. In addition, the digital camera 100 includes an optical system 110 and a lens driver 112, for example.

The optical system 110 includes a focus lens, a zoom lens, an optical image stabilization lens (OIS), a diaphragm, a shutter, and the like. The focus lens is a lens for changing the focus state of the subject image formed on the image sensor 115. The zoom lens is a lens for changing the magnification of the subject image formed by the optical system. Each of the focus lenses and the like includes one or a plurality of lenses.

The lens driver 112 drives a focus lens and the like in the optical system 110. The lens driver 112 includes a motor, and moves the focus lens along the optical axis of the optical system 110 based on the control of the controller 135. The configuration for driving the focus lens in the lens driver 112 can be implemented with a DC motor, a stepping motor, a servo motor, an ultrasonic motor, or the like.

The image sensor 115 captures a subject image formed via the optical system 110 to generate imaging data. The imaging data is image data indicating an image captured by the image sensor 115. The image sensor 115 generates image data for a new frame at a predetermined frame rate (e.g., 30 frames/second). Generation timing of the imaging data and electronic shutter operation in the image sensor 115 are controlled by the controller 135. As the image sensor 115, various image sensors such as a CMOS image sensor, a CCD image sensor, or an NMOS image sensor can be used.

The image sensor 115 performs imaging operations of a moving image and a still image, an imaging operation of a through image, and the like. The through image is mainly a moving image, and is displayed on the display monitor 130 in order to allow the user to determine composition for capturing a still image, for example. Each of the through image, the moving image, and the still image is an example of the captured image in the present embodiment. The image sensor 115 is an example of an image sensor in the present embodiment.

The image processing engine 120 performs various kinds of processing on the imaging data output from the image sensor 115 to generate image data, or performs various kinds of processing on the image data to generate images to be displayed on the display monitor 130. Various kinds of processing include white balance correction, gamma correction, YC conversion processing, electronic zoom processing, compression processing, expansion processing, and the like, but are not limited to these. The image processing engine 120 may be configured with a hard-wired electronic circuit, or may be configured with a microcomputer, a processor, or the like using a program.

In the present embodiment, the image processing engine 120 includes a face recognizer 122 that realizes a function of detecting a subject such as a human face by image recognition of a captured image. The face recognizer 122 performs face detection by, for example, rule-based image recognition processing and outputs detection information. The face detection may be performed by various image recognition algorithms. The detection information includes positional information corresponding to the detection result of the subject. The positional information is defined by a horizontal position and a vertical position on an image Im to be processed, for example. The positional information indicates a region surrounding a human face in a rectangular shape as a detected subject, for example (see FIGS. 5A to 5C).

The display monitor 130 is an example of a display that displays various kinds of information. For example, the display monitor 130 displays an image (through image) indicated by image data which is captured by the image sensor 115 and on which image processing by the image processing engine 120 is performed. In addition, the display monitor 130 displays a menu screen or the like for a user to make various settings for the digital camera 100. The display monitor 130 can include a liquid crystal display device or an organic EL device, for example.

The operation member 150 is a general term for hard keys such as operation buttons and operation levers provided on the exterior of the digital camera 100, and receives operations by a user. For example, the operation member 150 includes a release button, a mode dial, a touch panel, a cursor button, and a joystick. When receiving an operation by the user, the operation member 150 transmits an operation signal corresponding to the user operation to the controller 135.

The controller 135 entirely controls the whole operation of the digital camera 100. The controller 135 includes a CPU and the like, and a predetermined function is implemented with the CPU executing a program (software). The controller 135 may include a processor including a dedicated electronic circuit designed to implement a predetermined function instead of the CPU. That is, the controller 135 can be implemented with various processors such as a CPU, an MPU, a GPU, a DSU, an FPGA, and an ASIC. The controller 135 may include one or a plurality of processors. In addition, the controller 135 may be integrated in one semiconductor chip together with the image processing engine 120 and the like.

The buffer memory 125 is a recording medium that functions as a work memory for the image processing engine 120 and the controller 135. The buffer memory 125 is implemented by a dynamic random-access memory (DRAM) or the like. The flash memory 145 is a non-volatile recording medium. Although not shown, the controller 135 may include various internal memories and may incorporate, for example, a ROM. The ROM stores various programs to be executed by the controller 135. The controller 135 may incorporate a RAM that functions as a working area of the CPU.

The card slot 140 is a means into which a detachable memory card 142 is inserted. The card slot 140 can connect the memory card 142 electrically and mechanically. The memory card 142 is an external memory including a recording element such as a flash memory inside. The memory card 142 can store data such as image data generated by the image processing engine 120.

The communication module 155 is a communication module (circuit) that performs data communication conforming to the communication standard such as IEEE 802.11, Wi-Fi standard, or the like. The digital camera 100 can communicate with other apparatuses via the communication module 155. The digital camera 100 may communicate directly with other apparatuses via the communication module 155, or may communicate via an access point. The communication module 155 may be connectable to a communication network such as the Internet.

The microphone 161 is an example of a sound collector that collects sound. The microphone 161 converts the collected sound into an analog signal being an electric signal and outputs the signal. The microphone 161 of the present embodiment includes three microphone devices 161L, 161C, and 161R. The microphone 161 may include two, or four or more microphone devices.

The A/D converter 165 for the microphone converts the analog signal from the microphone 161 into audio data in a digital signal. The A/D converter 165 for the microphone is an example of an audio input device in the present embodiment. The microphone 161 may include a microphone device disposed outside the digital camera 100. In this case, the digital camera 100 includes, as the audio input device, an interface circuit for the external microphone.

The audio processing engine 170 receives the audio data output from the audio input device such as the A/D converter 165 for the microphone and performs various kinds of audio processing on the received audio data. The audio processing engine 170 is an example of an audio processor in the present embodiment.

The audio processing engine 170 of the present embodiment includes a beam former 172 and a gain adjuster 174 as shown in FIG. 1, for example. The beam former 172 realizes a function of controlling the directivity of sound. Details of the beam former 172 will be described below. The gain adjuster 174 performs multiplication processing of multiplying the input audio data by a sound collection gain set by, for example, the controller 135, to amplify the audio. The gain adjuster 174 may perform processing of multiplying the input audio data by a negative gain to suppress the audio. The gain adjuster 174 may further have a function of changing the frequency characteristic and stereo characteristic of the input audio data. Details of setting the sound collection gain will be described later.

1-1-1. Beam Former

Details of the beam former 172 in the present embodiment will be described as follows.

Figure 2:
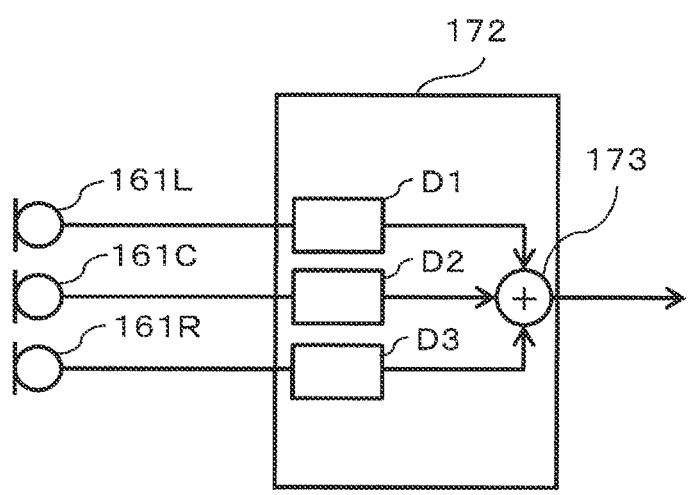
FIG. 2 is a diagram illustrating a configuration of a beam former 172 in the digital camera 100.

The beam former 172 performs beam forming for controlling the directivity of the sound collected by the microphone 161. FIG. 2 shows a configuration example of the beam former 172 in the present embodiment.

As shown in FIG. 2, the beam former 172 includes filters D1 to D3 and an adder 173, for example. The beam former 172 adjusts the delay period of the sound collected by each of the microphone devices 161L, 161C, and 161R, and outputs the weighted sum of each. The beam former 172 can control the direction and range of the sound collection directivity of the microphone 161, and set the physical range in which the microphone 161 collects sound.

The beam former 172 outputs one channel with one adder 173 in the drawing, but the beam former 172 may include two or more adders and may be configured to have outputs different for each channel such as stereo outputs. The beam former 172 may use a subtracter in addition to the adder 173 to form a directivity that has a dead angle. The dead angle is a direction having a particularly low sensitivity in a specific direction. The beam former 72 may perform adaptive beam forming with which the beam former 72 changes processing adapting to the environment. The beam former 172 may apply different processing to the audio signal depending on the frequency band of the audio signal.

FIG. 2 shows an example in which the microphone devices 161L, 161C, and 161R are linearly arranged, but the arrangement of the microphone devices is not limited to this. For example, even when the microphone devices 161L, 161C, and 161R are arranged in a triangular shape, the sound collection directivity of the microphone 161 can be controlled by appropriately adjusting the delay periods and weights of the filters D1 to D3. The beam former 172 may apply a known method to the control of the sound collection directivity. For example, processing of forming the directivity and processing of suppressing the noise of the audio may be performed using an audio processing technique such as OZO Audio.

The sound collection area of the digital camera 100 that can be set by the beam former 172 as described above will be described.

1-1-2. Sound Collection Area

FIGS. 3A to 3D show examples of sound collection areas defined as to the digital camera 100. FIGS. 3A to 3D illustrate the sound collection areas with fan-shaped regions of a circle centered on the digital camera 100. In FIGS. 3A to 3D, the X, Y, and Z axes respectively correspond to the horizontal angle-of-view direction of the digital camera 100, the vertical angle-of-view direction of the digital camera 100, and the optical axis direction of the lens in the optical system 110. In the digital camera 100 of the present embodiment, the horizontal angle-of-view direction coincides with the direction in which the microphone devices 161R, 161C, and 161R are aligned.

Figure 3B:
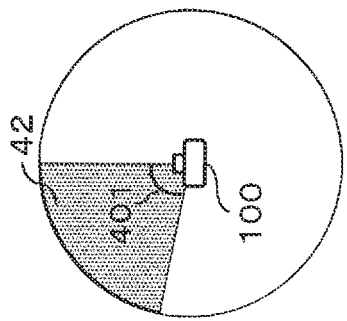
FIGS. 3A to 3D are diagrams illustrating sound collection areas in the digital camera 100.
Figure 3B:
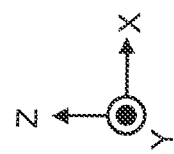
Figure 3D:
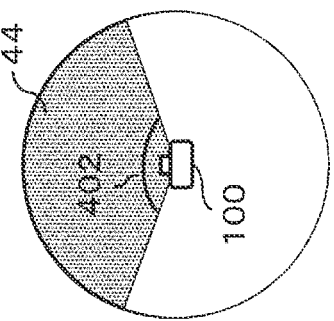
Figure 3D:
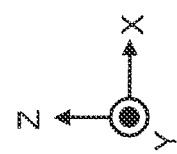
Figure 3A:
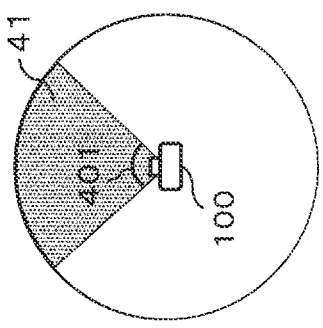
Figure 3A:
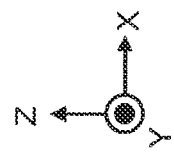
Figure 3C:
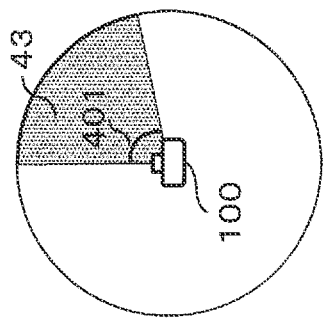
Figure 3C:
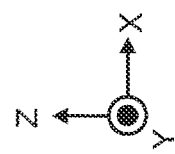

FIG. 3A shows a "front center sound collection area" 41 which directs the sound collection area in front of the digital camera 100 (i.e., in the shooting direction) in an angle range 401 (e.g., 70°). FIG. 3B shows a "left half sound collection area" 42 which directs the sound collection area to the left of the digital camera 100 in the angle range 401. FIG. 3C shows a "right half sound collection area" 43 which directs the sound collection area to the right of the digital camera 100 in the angle range 401. FIG. 3D shows a "front sound collection area" 44 which directs the sound collection area in front of the digital camera 100 in an angle range 402 larger than the angle range 401 (e.g., 160°). These sound collection areas 41 to 44 are examples of a plurality of predetermined areas in the present embodiment. The angle ranges 401 and 402 are examples of a first angle range and a second angle range.

The digital camera 100 of the present embodiment uses the front center sound collection area 41 in FIG. 3A when the subject is located at the central portion of the captured image. When the subject is located in the left half of the captured image, the left half sound collection area 42 in FIG. 3B is used. When the subject is located in the right half of the captured image, the right half sound collection area 43 in FIG. 3C is used. When the subject is located in the whole captured image, the front sound collection area 44 in FIG. 3D is mainly used.

Figure 5A:
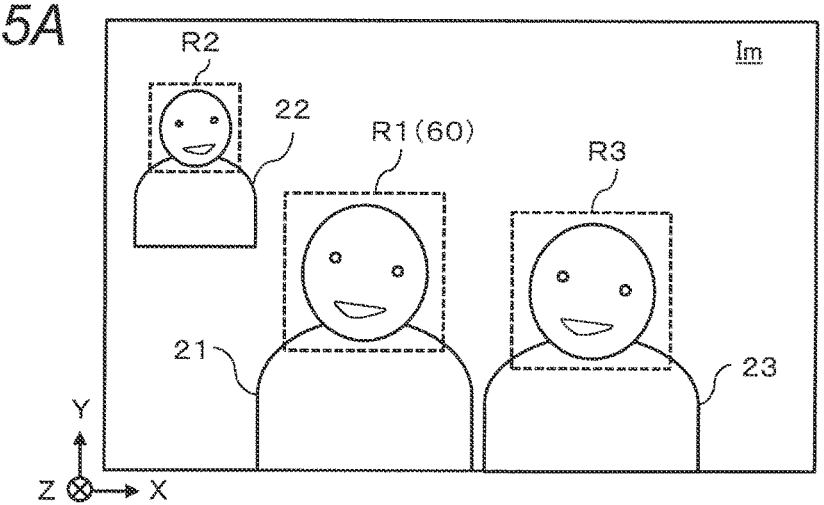
FIGS. 5A to 5C are diagrams for illustrating an outline of the operation of the digital camera 100.
Figure 5B:
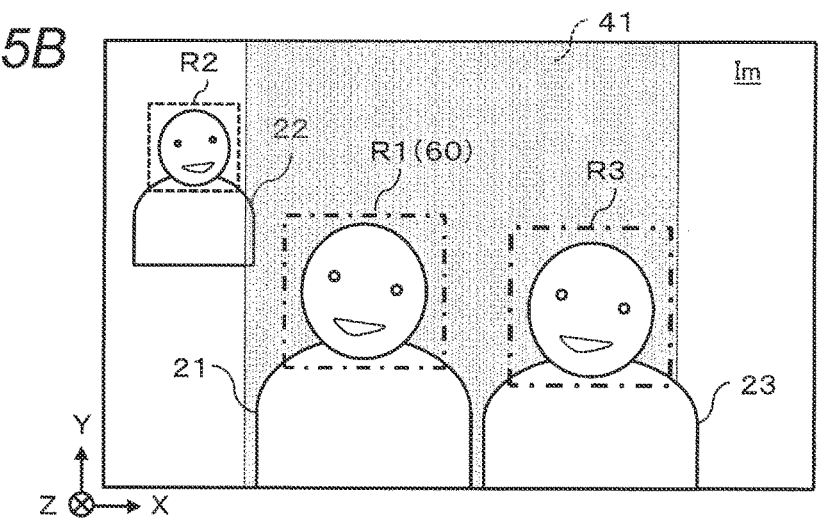

In the example in FIG. 5B, since the subjects R1 and R3 as the sound collection targets are located in the central portion of the captured image, the front center sound collection area 41 is used. In the example in FIG. 5C, since the subjects R1 and R2 as the sound collection targets are located in the left half of the captured image, the left half sound collection area 42 is used.

In the sound collector of the imaging apparatus such as the microphone 161 of the digital camera 100, the number and arrangement of microphone devices are constrained by circumstances such as the mounting space of the devices. For example, for a shooting scene in which a user wants to record audios for a plurality of subjects, there are cases where the sound collection directivity cannot be sufficiently narrowed due to the limitation on the number of microphone devices. Even in such a case, the digital camera 100 according to the present embodiment can provide a sound collection area in line with the user's intention by preliminarily defining a sound collection area assuming a shooting scene of the user, and determining the sound collection area with face recognition.

1-2. Operation

The operation of the digital camera 100 configured as described above will be described. In the following, the operation of the digital camera 100 during shooting a moving image will be described.

The digital camera 100 sequentially captures a subject image formed via the optical system 110 with the image sensor 115 to generate captured image data. The image processing engine 120 performs various kinds of processing on the captured image data generated by the image sensor 115 to generate image data, and records the image data in the buffer memory 125. In addition, the face recognizer 122 of the image processing engine 120 detects the region of the subject based on the image indicated by the captured image data and outputs detection information to the controller 135, for example.

The digital camera 100 of the present embodiment has a face recognition mode. The face recognition mode is an operation mode for performing face detection in the captured image that is input into the face recognizer 122 by image recognition processing, to identify the subject to be the target of autofocus (AF) control based on the detection information.

Concurrently with the above imaging operation, the digital camera 100 collects sound with the microphone 161. The audio processing engine 170 processes the audio data of the sound collection result from the A/D converter 165 for the microphone. The audio processing engine 170 records the processed audio data Aout in the buffer memory 125.

The controller 135 synchronizes the image data received from the image processing engine 120 and the audio data received from the audio processing engine 170 via the buffer memory 125, and records a moving image in the memory card 142. In addition, the controller 135 sequentially causes the display monitor 130 to display a through image. The user can check the composition of the shooting and the like at any time from the through image on the display monitor 130. The operation of moving image shooting is started/ended according to the user operation in the operation member 150.

The moving image shooting of the digital camera 100 as described above may be performed with user's intention of focusing attention on a group of subjects who have conversations within the group, such as a cameraman and his companion. In this case, user's intention may be also on audios, for clearly collecting the conversation of the subject group.

The digital camera 100 of the present embodiment detects subjects based on the detection information by the face recognizer 122 in the image processing engine 120. When the AF target subject is determined, the audio processing engine 170 executes processing of emphasizing the audios to be collected from the subject and subjects around the subject. Thus, the face recognition of the image processing engine 120 is cooperated with the audio emphasis and the like of the audio processing engine 170, to accurately achieve sound collection that emphasizes the sound from the group of subjects having the conversation as described above.

1-2-1. Outline of Operation

An outline of the operation of the digital camera 100 according to the present embodiment will be described with reference to FIGS. 4 and 5A to 5C.

Figure 4:
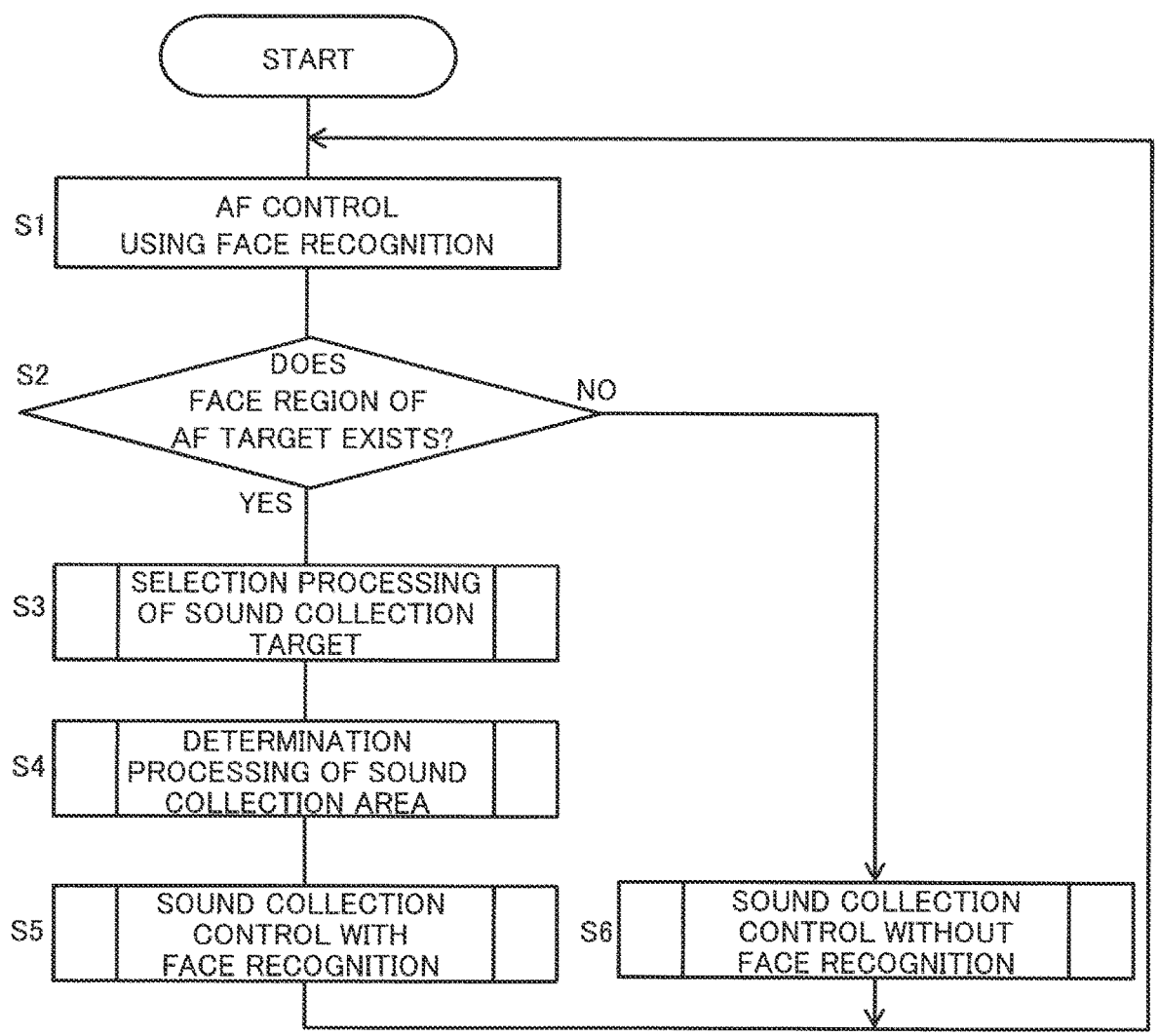
FIG. 4 is a flowchart illustrating an operation of the digital camera 100 according to the first embodiment.
Figure 5C:
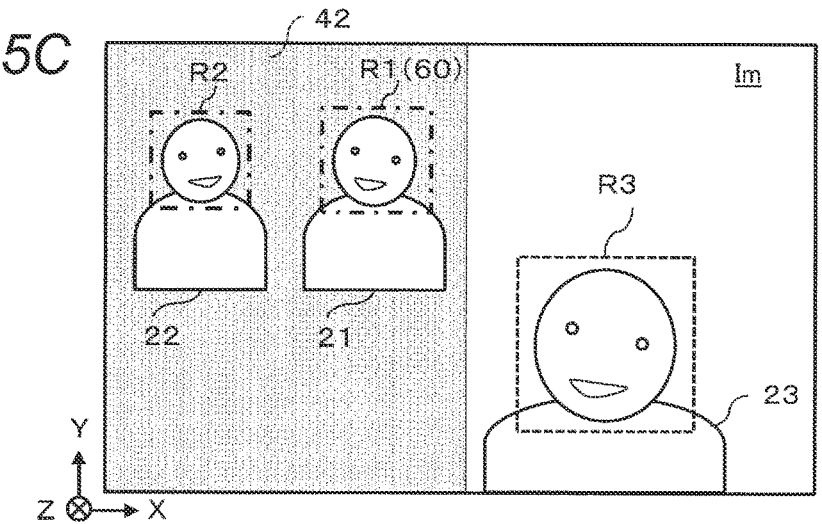

FIG. 4 is a flowchart illustrating the operation of the digital camera 100 according to the present embodiment. Each processing shown in the flowchart in FIG. 4 is repeatedly performed at a predetermined period during shooting of a moving image when the operation mode of the digital camera 100 is a face recognition mode, for example. The predetermined period is, for example, a frame period of a moving image. FIGS. 5A to 5C are diagrams for illustrating the outline of the operation of the digital camera 100 according to the present embodiment.

The controller 135 identifies the AF target based on the detection information by the face recognizer 122 and performs AF control (S1). The AF target indicates a region on the image of a subject which is the target of the AF control. FIG. 5A illustrates a captured image Im including face regions R1, R2, and R3 each of which indicates a region in which a subject is detected in the detection information by the face recognizer 122. The face regions R1, R2, and R3 are examples of the subject regions in the present embodiment. For example, the face region R1 is identified as a face region 60 of the AF target.

Next, the controller 135 determines whether or not there exists a face region identified as the AF target (S2). Specifically, the controller 135 determines whether or not a face region is detected and the AF target is the face region.

When there is the face region 60 of the AF target (YES in S2), the controller 135 performs processing of selecting a sound collection target of the microphone 161 from subjects in the detection information (S3). The sound collection target is a subject to be a target whose sound is emphatically collected with the microphone 161. The face region R1 (60) identified as the AF target is a sound collection target. FIG. 5B shows an example in which the face regions R1 and R3 are determined as the sound collection targets, while the face region R2 is not determined as the sound collection target, based on the detection information shown in FIG. 5A.

In the selection processing of the sound collection target (S3), the digital camera 100 of the present embodiment determines the face region R3, which indicates substantially the same face size as the face region R1 (60) of the AF target in the captured image Im, as an additional sound collection target in addition to the face region R1. On the other hand, the face region R2 having a size different from that of the face region R1 is eliminated from the sound collection target. Thus, the group of subjects talking with each other can be set as sound collection targets by reflecting that a person 21 and a person 23 are at similar distances from the digital camera 100 (i.e., the difference in the distance in the Z-axis direction is small) and that a person 22 is at a different distance. Details of the selection processing of the sound collection target (S3) will be described later.

Next, the controller 135 performs processing of determining a sound collection area based on determined sound collection targets (S4). The determination processing of the sound collection area (S4) determines a sound collection area including all the determined sound collection targets. In the example in FIG. 5B, the sound collection area is determined to the front center sound collection area 41 (FIG. 3A) so as to include the face regions R1 and R3 as the sound collection targets. Details of the determination processing of the sound collection area (S4) will be described later.

Next, the controller 135 controls sound collection with face recognition based on the determined sound collection targets and sound collection area. The sound collection control with face recognition (S5) is performed by setting the sound collection target, the sound collection area, and sound collection parameters including sound collection gain, which are determined by the controller 135, into the audio processing engine 170. The audio processing engine 170 realizes a sound collection directivity and a sound collection gain corresponding to the sound collection parameters.

On the other hand, when there is no face region 60 of the AF target (NO in S2), such as no face region being detected during operation in the face recognition mode, the controller 135 performs sound collection control without face recognition (S6). Details of the sound collection control with or without face recognition (S5 or S6) will be described later.

The controller 135 performs the sound collection control in step S5 or S6, and then repeats the processing in and after step S.

According to the above processing, the digital camera 100 of the present embodiment selects the sound collection target from subjects detected by face recognition, determines the sound collection area that includes all the sound collection targets, and performs sound collection control with face recognition. Thus, sound can be emphatically picked up from a group of subjects talking with each other, for example.

In the AF control by face recognition (S1), the identification of AF targets based on the detection information can be performed by, for example, displaying a frame which indicates a face region on the through image displayed on the display monitor 130, and inputting a user operation to select the frame with the operation member 150.

FIG. 5C shows an example of the captured image Im when the persons 21 to 23 are in positions different from those in FIGS. 5A and 5B. Similarly to the example in FIG. 5B, the digital camera 100 first identifies the face region R1 as the face region 60 of the AF target (S1) and determines the face region R1 as the sound collection target, for example. In the example in FIG. 5C, the selection processing of the sound collection target (S3) determines the face region R2 having the similar size as the face region R1 on the captured image Im as the sound collection target and eliminates the face region R3 from the sound collection target. The determination processing of the sound collection area (S4) determines the left half sound collection area 42 (FIG. 3B), which includes the face regions R1 and R2 determined as the sound collection targets, as the sound collection area. The sound collection control with face recognition (S5) is performed by setting the sound collection parameters so that the sound of the persons 21 and 22 can be clearly collected by controlling the directivity to the left half sound collection area 42.

1-2-2. Selection Processing of Sound Collection Target

Details of the selection processing of the sound collection target in step S3 in FIG. 4 will be described with reference to FIGS. 6 to 7C.

Figure 6:
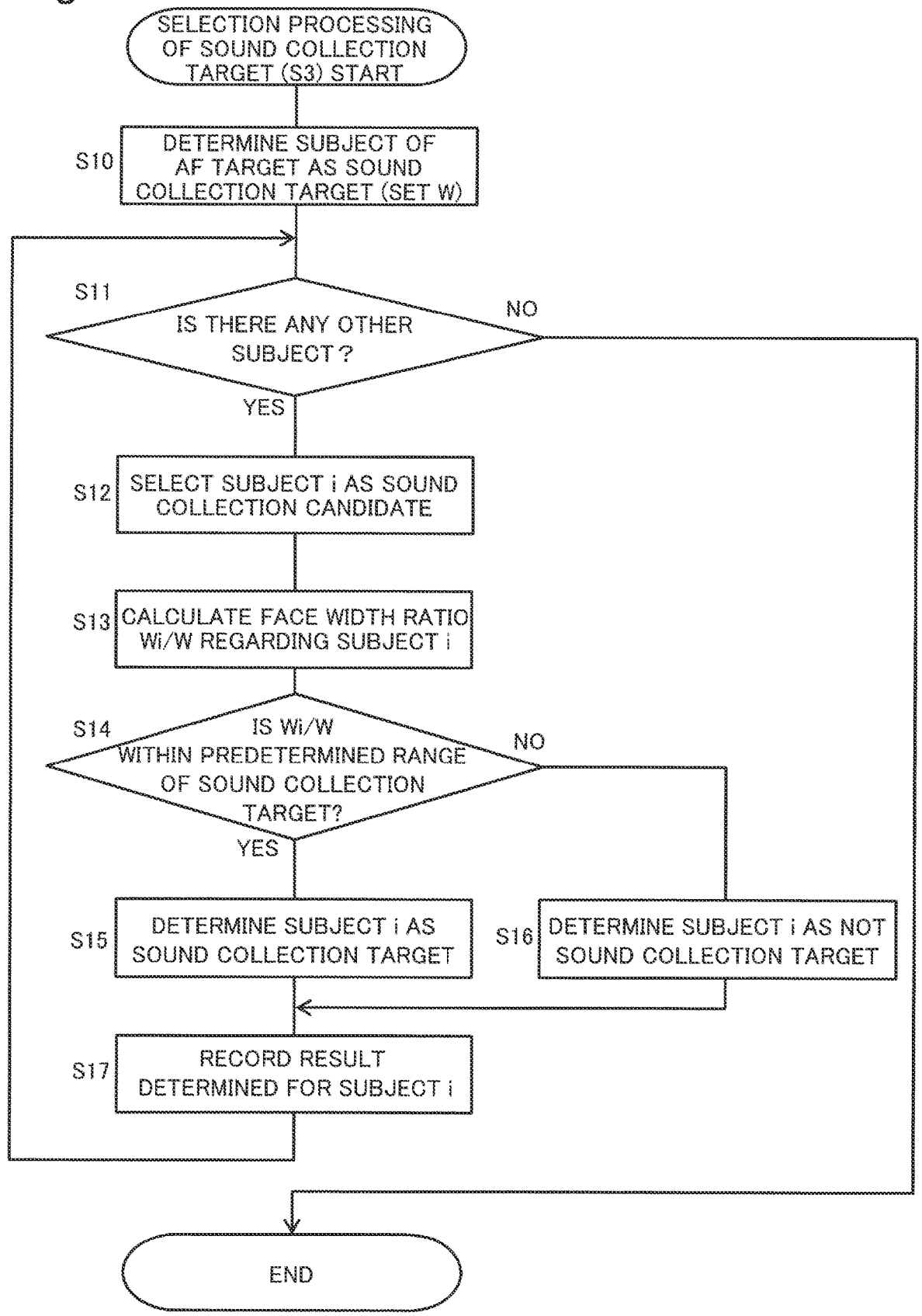
FIG. 6 is a flowchart illustrating selection processing of a sound collection target (S3 in FIG. 4) of the digital camera 100 according to the first embodiment.

FIG. 6 is a flowchart illustrating the selection processing of the sound collection target (S3) of the digital camera 100. Each process according to the flowchart shown in FIG. 6 is performed by, for example, the controller 135 of the digital camera 100, when the process proceeds to YES in step S11 in FIG. 4.

Figure 7A:
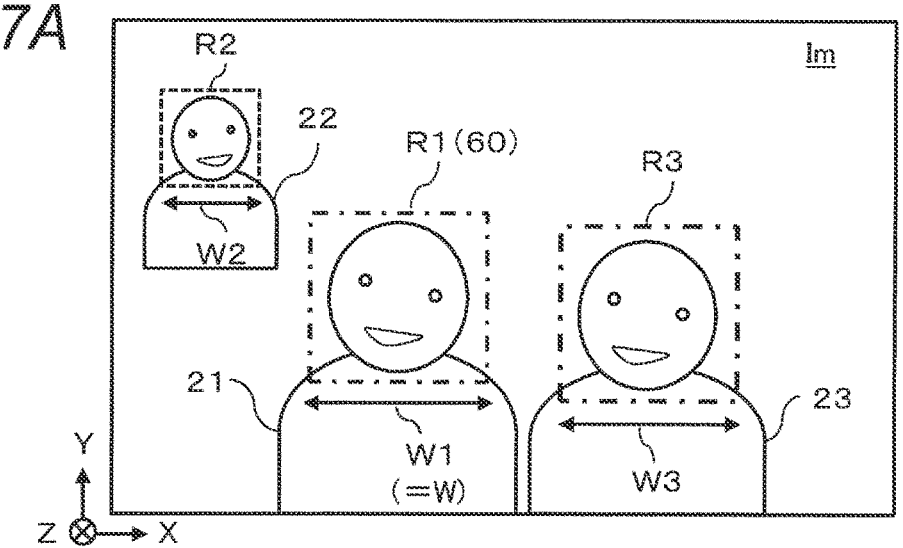
FIGS. 7A to 7C are diagrams for illustrating the selection processing of a sound collection target of the digital camera 100.
Figure 7B:
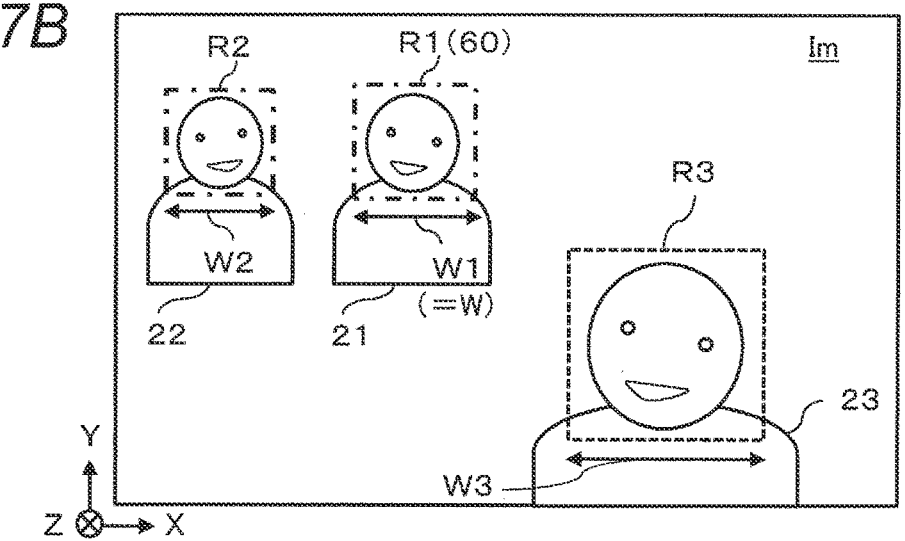
Figure 7C:
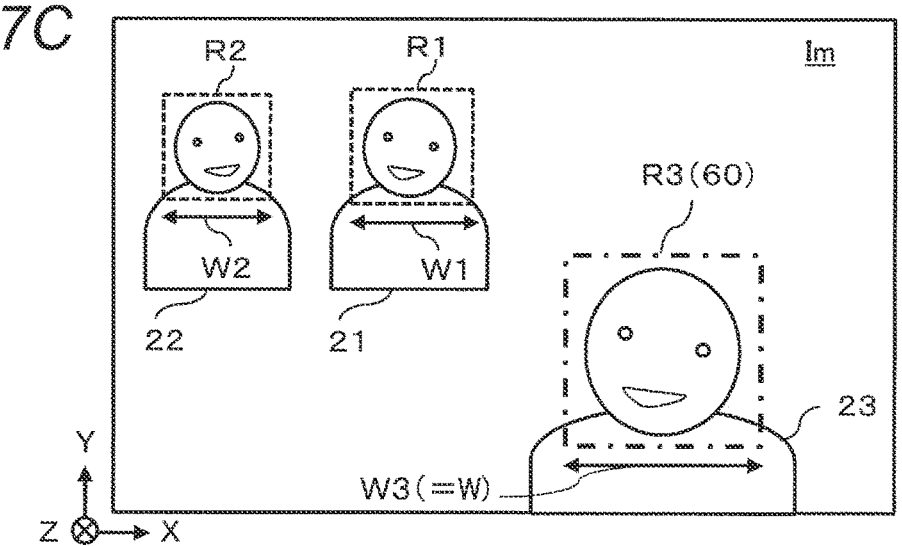

FIGS. 7A to 7C are diagrams for illustrating the selection processing of the sound collection target (S3) in the digital camera 100. In the following, the operation of determining the sound collection target will be described in the example in FIGS. 5A and 5B.

In the flowchart in FIG. 6, the controller 135 determines, as the sound collection target, a subject corresponding to the face region of the AF target identified in step S1 in FIG. 4 (S10). At this time, the controller 135 sets the size of the face region of the AF target (i.e., the face width W) as a reference for selecting the sound collection target from other subjects based on the detection information received from the face recognizer 122.

FIG. 7A illustrates a case where the sound collection target is selected in the examples in FIGS. 5A and 5B. Face widths W1, W2, and W3 respectively indicate the sizes of the face regions R1, R2, and R3 in the captured image Im, with widths in the X-axis direction. In the example in FIG. 7A, the controller 135 sets the face width W1 of the face region R1 of the AF target to a reference face width W (S10). The set face width W is held, for example, in a RAM of the controller 135.

Next, the controller 135 determines whether there is a detected subject other than the AF target (S11). Specifically, the controller 135 determines whether the detection information by the face recognizer 122 includes a face region other than the face region of the AF target.

When there is a detected subject other than the AF target (YES in S11), the controller 135 selects one subject i as a sound collection candidate that is a candidate for the sound collection target (S12). In the example in FIG. 7A, from the detection information, the face regions R2 and R3 other than the face region R1 of the AF target are sequentially selected in each step S12 in association with the subject i of the sound collection candidate.

The controller 135 performs calculation of comparing the face width Wi of the selected subject i with the reference face width W (S13). Specifically, the controller 135 calculates the ratio Wi/W of the face width Wi of the subject i to the reference face width W. In the example in FIG. 7A, when the face region R2 is selected as a sound collection candidate (S12), the ratio W2/W for the face width W2 is calculated (S13).

The controller 135 determines whether the ratio Wi/W between the face width Wi of the sound collection candidate and the reference face width W is within a predetermined range (S14). The predetermined range is defined by an upper limit which is larger than "1" and a lower limit which is smaller than "1" from the viewpoint of defining the range in which the face width Wi of the sound collection candidate is regarded as relatively the same as the reference face width Wi, for example. For setting the predetermined range, a user interface may be provided. For example, the predetermined range set by the user using the operation member 150 may be held in the buffer memory 125 or the like.

When determining that the ratio Wi/W of the face width is within the predetermined range (YES in S14), the controller 135 determines that the subject i is the sound collection target (S15).

On the other hand, when determining that the ratio Wi/W of the face width is not within the predetermined range (NO in S14), the controller 135 determines that the subject i is not the sound collection target (S16). In the example in FIG. 7A, the ratio W2/W is less than the lower limit of the predetermined range. Thus, it is determined that the face region R2 is not the sound collection target.

After determining whether or not the subject i is the sound collection target (S15 or S16), the controller 135 records information on the result determined for the subject i in the buffer memory 125 (S17), for example. Next, the controller 135 performs the processing in and after step S11 again on a subject other than the subject already selected as the sound collection candidate.

In the example in FIG. 7A, the face region R3 is included in the detection information in addition to the face region R2 (YES in S11). When selecting the subject corresponding to the face region R3 (S12), the controller 135 calculates the ratio W3/W of the face width W3 to the reference face width W (S13), as in the case of the face region R2. In the example in FIG. 7A, the ratio W3/W is calculated to be near "1". The controller 135 determines that the calculated ratio W3/W of the face width is within the predetermined range of the sound collection target (YES in S14), and determines the subject corresponding to the face region R3 as the sound collection target (S15).

The controller 135 repeats the processing of steps S1 to S17 until every subject is selected as a sound collection candidate (NO in step S1). Thereafter, the controller 135 ends the selection processing of the sound collection target (S3), and proceeds to step S4 in FIG. 4.

According to the above processing, the subjects detected by face recognition is checked by comparing the relative sizes of the face regions R2 and R3 with the face region R1 identified as the AF target as the reference. Thus, a subject whose relative size of the face region R3 is substantially the same as that of the face region R1 of the AF target can be selected and determined as the sound collection target.

FIG. 7B illustrates a case where the sound collection target is selected in the example in FIG. 5C. In the example in FIG. 7B, the face region R1 is identified as the AF target as in the example in FIG. 7A. Therefore, the controller 135 determines the face region R1 as the sound collection target and sets the face width W1 to the reference face width W (S10).

In the example in FIG. 7B, the face width W2 of the face region R2 is substantially the same as the face width W (=W1) of the reference. On the other hand, the face width W3 of the face region R3 is larger than the other face widths Wi and W2. In the present example, the controller 135 determines that the ratio W2/W is within the predetermined range (YES in S14), and determines the subject in the face region R2 as the sound collection target (S15). On the other hand, since the ratio W3/W is greater than the upper limit of the predetermined range (NO in S14), it is determined that the subject in the face region R3 is not set as the sound collection target (S16). Therefore, the sound collection target of the present example is determined to be the two subjects corresponding to the face regions R1 and R2 (see FIG. 5C).

FIG. 7C illustrates a case where the face region R3 is identified as the face region 60 of the AF target (S1 in FIG. 4) in the captured image Im similar to that in FIG. 5C. The controller 135 determines the face region R3 as the sound collection target, and sets the face width W3 to the reference face width W (S10). In the example in FIG. 7C, since each of the ratios W2/W and W1/W is less than the lower limit of the predetermined range (NO in S14), it is determined that the subjects corresponding to the face regions R1 and R2 are not the sound collection targets (S16). Therefore, the sound collection target of the present example is determined as one subject corresponding to the face region R3.

As described above, the digital camera 100 of the present embodiment determines, as the sound collection target, a subject having substantially the same size as the AF target from a plurality of subjects detected by image recognition. The determined sound collection target can be used for determining a sound collection area in line with the user's intention as described below.

1-2-3. Determination Processing of Sound Collection Area

Details of the determination processing of the sound collection area in step S4 in FIG. 4 will be described with reference to FIGS. 8 to 9C.

Figure 8:
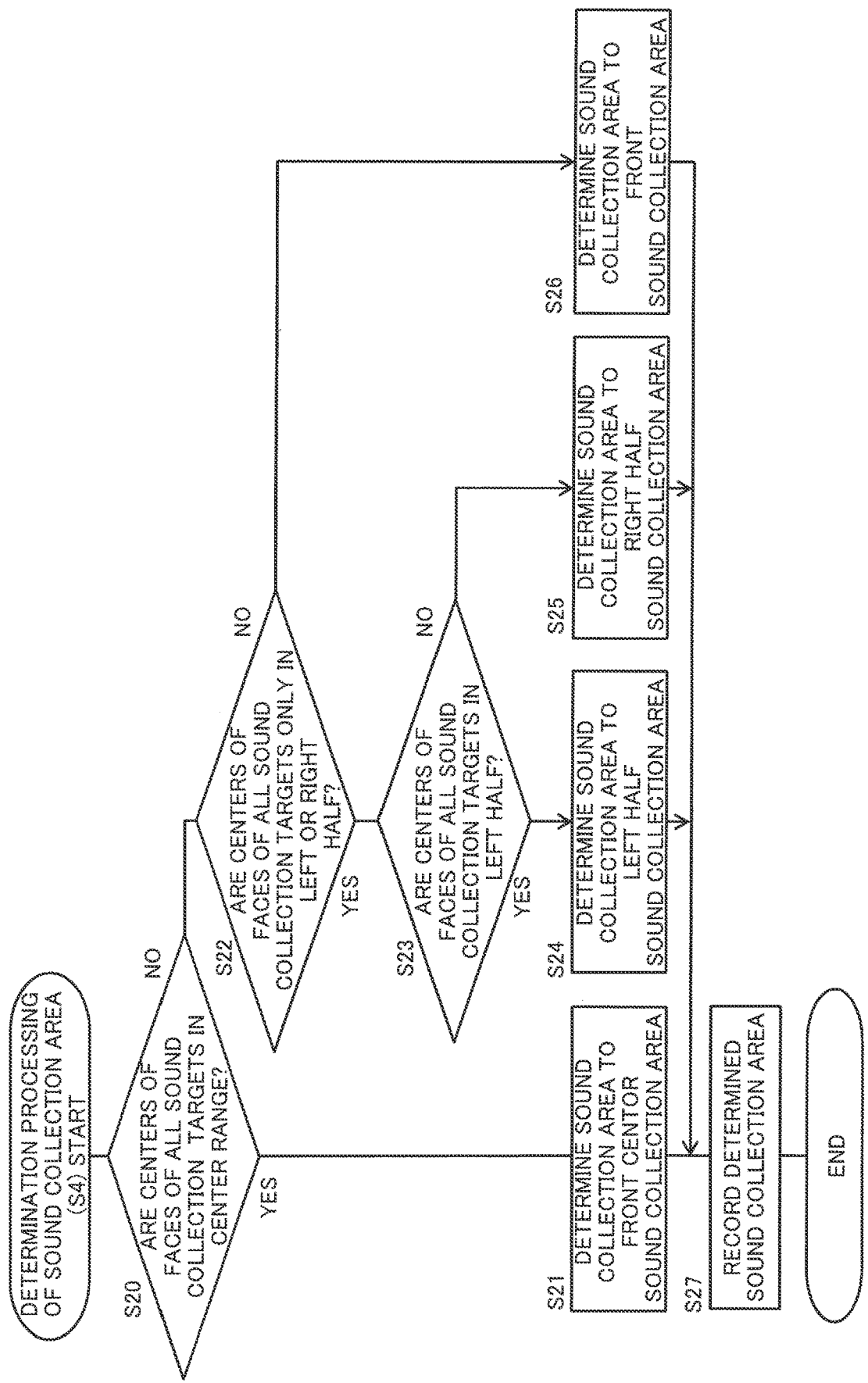
FIG. 8 is a flowchart illustrating determination processing of a sound collection area (S4 in FIG. 4) of the digital camera 100.

FIG. 8 is a flowchart illustrating the determination processing of the sound collection area (S4) in the digital camera 100 of the present embodiment. Each process according to the flowchart shown in FIG. 8 is performed by, for example, the controller 135 of the digital camera 100, after step S3 in FIG. 4 is performed.

Figure 9A:
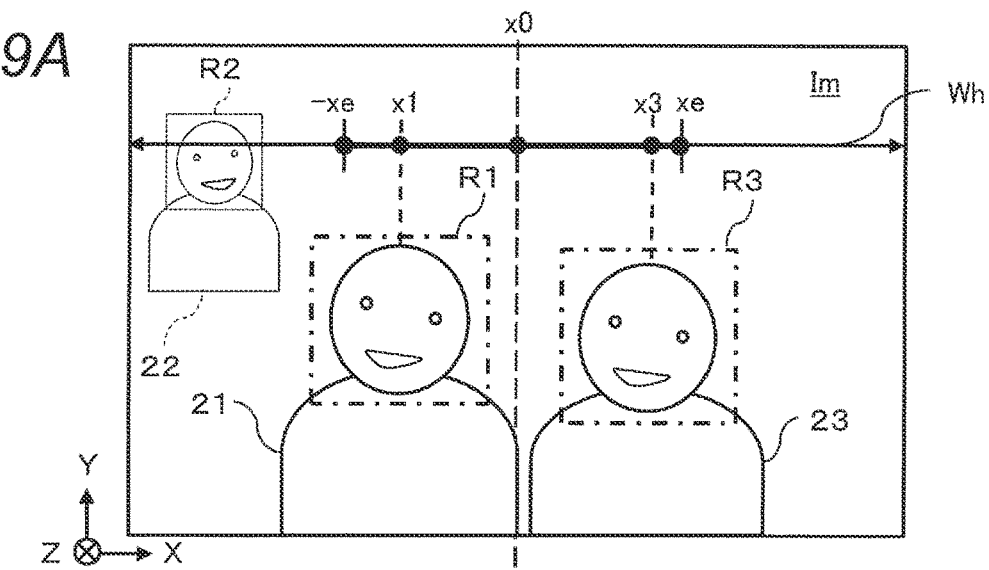
FIGS. 9A to 9C are diagrams for illustrating the determination processing of a sound collection area of the digital camera 100.
Figure 9B:
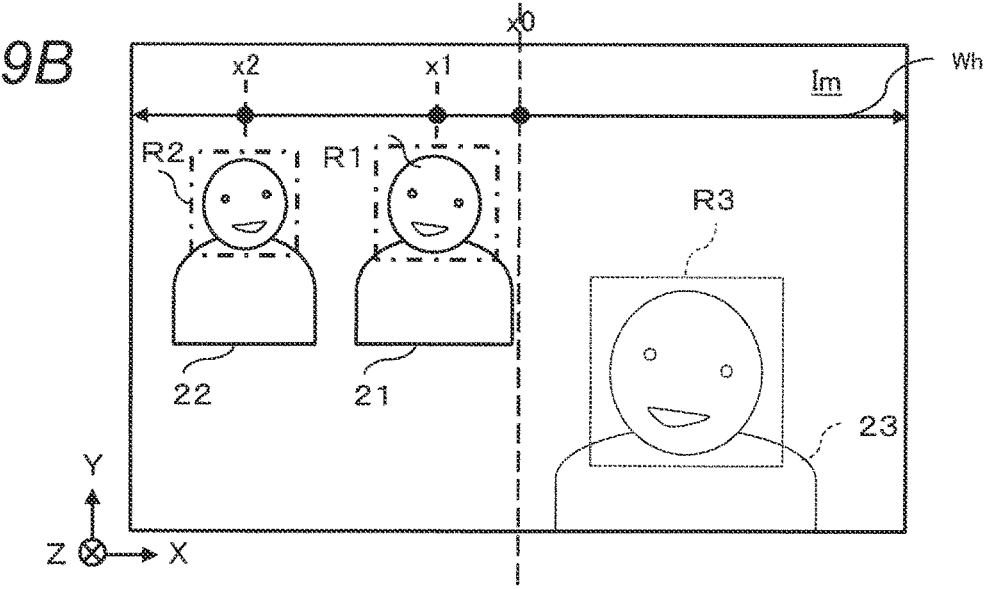
Figure 9C:
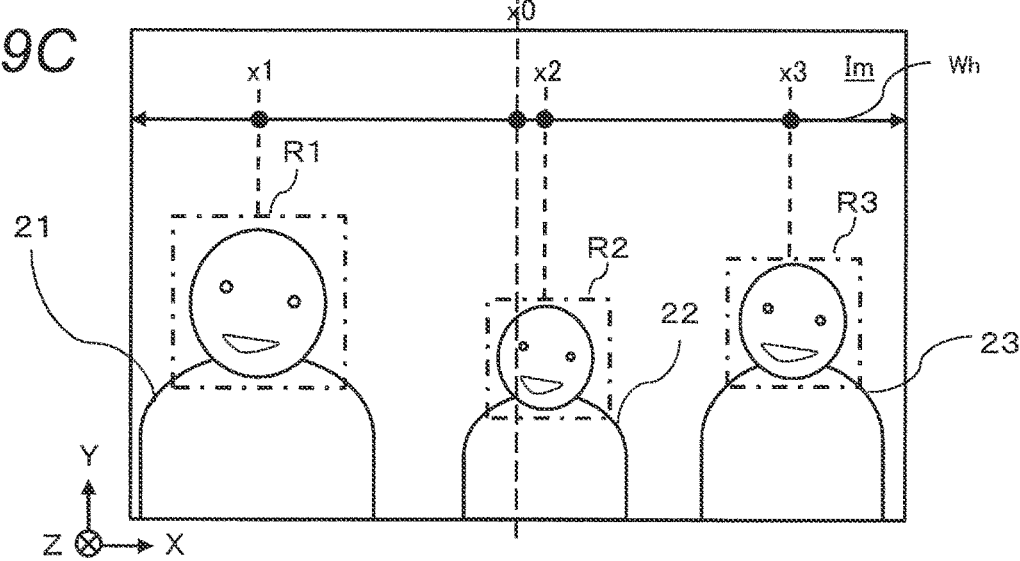

FIGS. 9A to 9C are diagrams for illustrating the determination processing of the sound collection area (S4) of the digital camera 100. FIGS. 9A and 9B illustrate the cases where the sound collection area is determined, subsequently to the examples in FIGS. 7A and 7B, respectively. FIG. 9C illustrates another case from those in FIGS. 9A and 9B. In FIGS. 9A to 9C, a center position x0 indicates the position of the center of the captured image Im in the X-axis direction, and an image width Wh indicates the width of the captured image Im in the X-axis direction. The image range is defined as a range (x0±xh) from −xh to xh on the X coordinate with reference to the center position x0 on the captured image Im. The X coordinate xh is defined by xh=Wh/2 (>0).

In the flowchart in FIG. 8, for all the sound collection targets, the controller 135 determines whether the position of the center or the like of the face region is in a center range of the captured image Im (S20). The center range is a range associated with the front center sound collection area 41 in the captured image Im.

For example, as shown in FIG. 9A, the center range is defined as a range (x0±xe) from −xe to xe on the X coordinate with reference to the center position x0 on the captured image Im. The X coordinate xe is defined by xe=xh×θe/h (>0) based on a predetermined angle of view θe and a horizontal angle of view θh corresponding to the image width Wh, for example. The predetermined angle of view θe is set in advance from the viewpoint of including one person, for example, and is 30° or the like. The controller 135 acquires the current horizontal angle of view θh from the zoom magnification or the like of the zoom lens of the optical system 110, for example, and calculates the center range (x0±xe).

For wide-angle shooting in which the horizontal angle of view θh is large, the X coordinate xe is reduced and the center range (x0±xe) is narrow. On the other hand, for telephoto shooting in which the horizontal angle of view θh is small, the X coordinate xe is increased and the center range (x0±xe) is wide. Thus, the determination of the sound collection area corresponding to the physical range and distance to be shot can be easily achieved.

When the positions of the face regions of all the sound collection targets are within the center range (YES in S20), the controller 135 determines the sound collection area to the front center sound collection area 41 (S21). In the example in FIG. 9A, the sound collection targets correspond to the face regions R1 and R3. The center positions x1 and x3 of the respective face regions R1 and R3 are both within the range of (x0±xe) (YES in S20). Therefore, the sound collection area is determined as the front center sound collection area 41 (S21, see FIG. 5B).

On the other hand, when the position of at least one face region of the sound collection target is not within the center range (NO in S20), a sound collection area other than the front center sound collection area 41 is used. In this case, the controller 135 determines whether the positions of the face regions of all the sound collection targets are only in any one of the left half and the right half in the captured image Im (S22), for example. The left half range is a range in which the X coordinate is smaller than the center position x0 in the X-axis direction, and the right half range is a range in which the X coordinate is larger than the center position x0.

When the positions of the face regions of all the sound collection targets are only in the range of the left half or right half in the captured image Im (YES in S22), the controller 135 further determines whether the positions of the face regions of all the sound collection targets are within the left half range in the captured image Im (S23).

When the positions of the face regions of all the sound collection targets are within the range of the left half in the captured image Im (YES in S23), the controller 135 determines the sound collection area to the left half sound collection area 42 (S24). In the example in FIG. 9B, the sound collection targets correspond to the face regions R1 and R2. Since a position x1 of the face region R1 and a position x2 of the face region R2 are on the left side of (i.e., their X coordinates are smaller than) the center position x0 in the X-axis direction (YES in S23), the sound collection area is determined as the left half sound collection area 42 (S24, see FIG. 5C).

On the other hand, when the positions of the face regions of all the sound collection targets are within the right half and not within the left half of the captured image Im (NO in S23), the controller 135 determines the sound collection area to the right half sound collection area 43 (S25).

On the other hand, when the positions of the face regions of all the sound collection targets are within the right half and not within the left half of the captured image Im (NO in S23), the controller 135 determines the sound collection area to the right half sound collection area 43 (S25).

When the positions of the face regions of all the sound collection targets are not in only the left half or only the right half of the captured image Im (NO in S22), the controller 135 determines the sound collection area to the front sound collection area 44 (S26). As shown in FIGS. 3D and 3A, the front sound collection area 44 has the angle range 402 wider than the angle range 401 of the front center sound collection area 41. That is, the front sound collection area 44 includes subjects of the sound collection targets positioned in a range wide in the X-axis direction in the captured image Im.

In the example in FIG. 9C, the sound collection targets correspond to the face regions R1, R2, and R3. The center positions x1, x2, and x3 of the face regions R1 to R3 include the positions x1 and x2 outside the center range (x0±xe) (NO in S20) Furthermore, the center positions x1 to x3 include the position x1 within the left half range and the positions x2 and x3 within the right half range (NO in S22 and S23). Therefore, in the present example, the sound collection area is determined to the front sound collection area 44 (S26).

After determining the sound collection area (S21, S24 to S26), the controller 135 records the determined sound collection area in the buffer memory 125 or the like as management information (S27). Thus, the determination processing of the sound collection area (S4) ends, and the process proceeds to step S5 in FIG. 4.

According to the above processing, the sound collection area is determined from a plurality of predefined sound collection areas so as to include all the sound collection targets according to the position of the subject determined as the sound collection target on the captured image. Thus, for capturing a moving image, it is possible to determine the sound collection area so as to include a subject of the sound collection target in line with the user's intention.

FIGS. 11A and 11B are diagrams for illustrating the management information obtained by the determination processing of the sound collection area (S4). FIG. 11A illustrates the management information obtained at the phase of performing the selection processing of the sound collection target (S3) and the determination processing of the sound collection area (S4) in the example in FIGS. 7A and 9A. FIG. 11B illustrates the management information in the example in FIGS. 7B and 9B.

For example, the management information associates and manages the "sound collection target" determined by the selection processing of the sound collection target (S3), the "sound collection area", "horizontal angle of view", and "focusing distance" determined by the determination processing of the sound collection area (S4). The focusing distance is acquired when the AF control by face recognition (S1) is performed, for example. For example, the controller 135 may acquire the corresponding focusing distance based on the positions or focal lengths of various lenses of the optical system 110 at the time of focusing. In addition, the digital camera 100 may detect the focusing distance by the depth from defocus (DFD) technique or the measurement by a range sensor.

In the digital camera 100 of the present embodiment, the angle of view Ae of the center range used for the determination of the front center sound collection area (S20) can be set, and is recorded in the ROM of the controller 135, for example. In addition, a user interface for setting the angle of view ee may be provided. For example, the value set by the user using the operation member 150 may be held in the buffer memory 125 or the like.

1-2-4. Sound Collection Control (1) Step S5 in FIG. 4

Details of the sound collection control with face recognition in step S5 in FIG. 4 will be described with reference to FIGS. 10 to 12B.

For the sound collection control by the sound collection parameter setting, the digital camera 100 of the present embodiment sets the sound collection gain so as to emphasize the moving image audio of the subject corresponding to the face region of the AF target, for example. The sound collection gain has a frequency filter characteristic and a stereo separation characteristic, for example. The digital camera 100 calculates the sound collection gain based on the horizontal angle of view and the focusing distance obtained when the digital camera 100 focus on the face region of the AF target during shooting a moving image, for example. The sound collection gain is defined such that the sound zoom effect is achieved by suppressing the frequency band other than the human voice as the calculated value increases and by controlling the stereo effect, for example.

Figure 10:
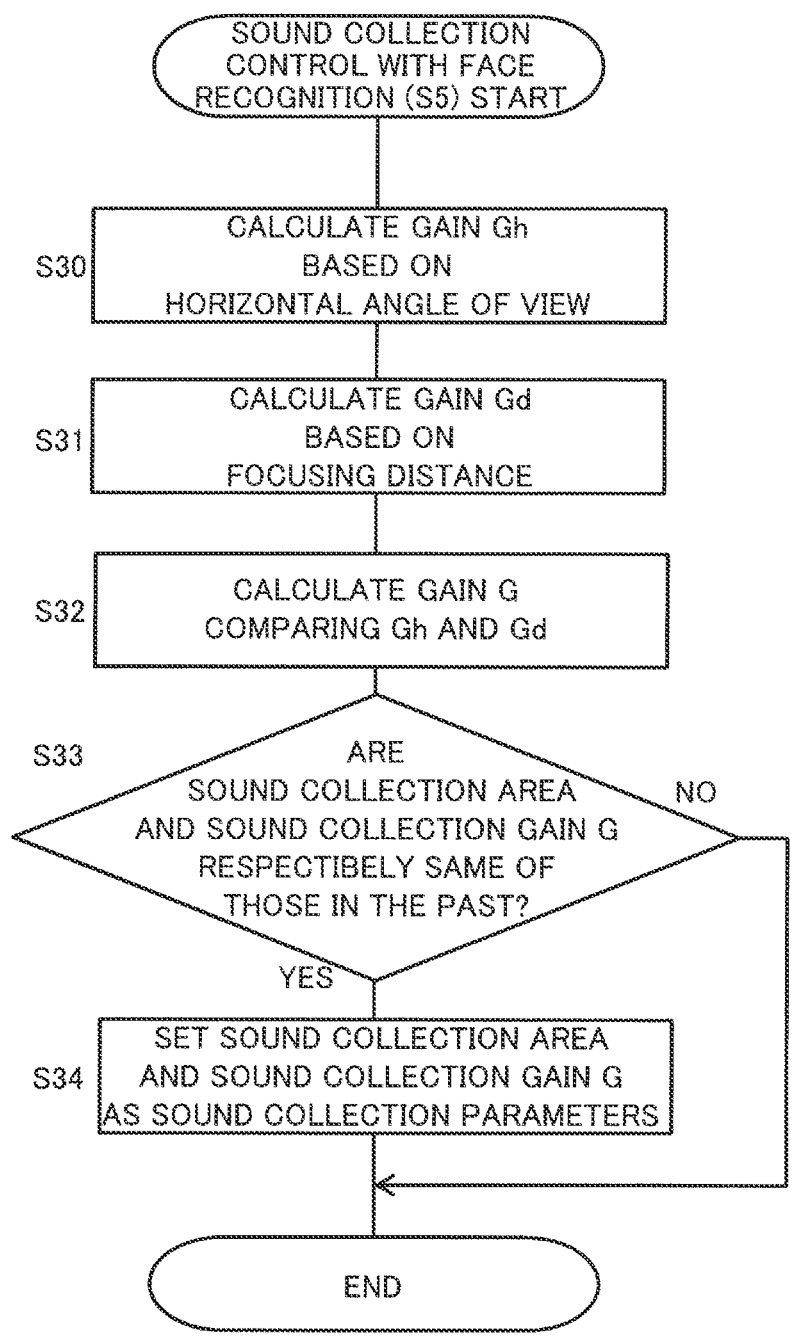
FIG. 10 is a flowchart illustrating sound collection control with face recognition (S5 in FIG. 4) of the digital camera 100.

FIG. 10 is a flowchart illustrating the sound collection control with face recognition (S5). Each process shown in the flowchart in FIG. 10 is performed by, for example, the controller 135 of the digital camera 100, after step S4 in FIG. 4 is performed.

The digital camera 100 starts the processing in step S5 in a state where the management information shown in FIGS. 11A and 11B is held.

Figure 12A:
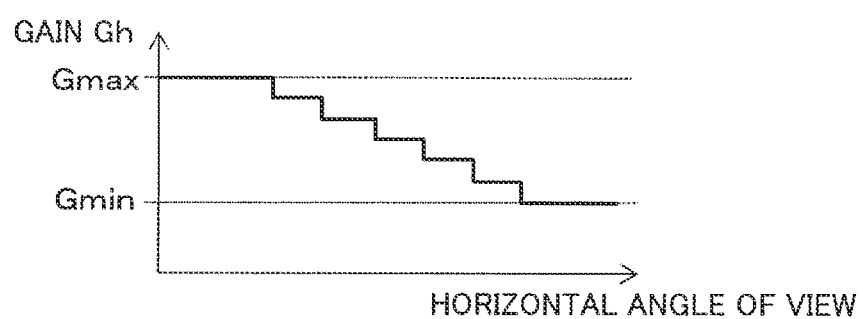
FIGS. 12A and 12B are diagrams illustrating relationships for obtaining gains from a horizontal angle of view and a focusing distance of the digital camera 100.

The controller 135 acquires the horizontal angle of view from the buffer memory 125, for example, and calculates a gain Gh based on the horizontal angle of view (S30). FIG. 12A illustrates the relationship for obtaining the gain Gh from the horizontal angle of view. In the example in FIG. 12A, within a predetermined maximum value Gmax and a predetermined minimum value Gmin of the gain, the gain Gh increases as the horizontal angle of view decreases. Thus, the smaller the horizontal angle of view is due to zooming or the like, the larger the gain becomes at the time of sound collection, so that the sound of the subject shot on the telephoto side can be emphasized.

Figure 12B:
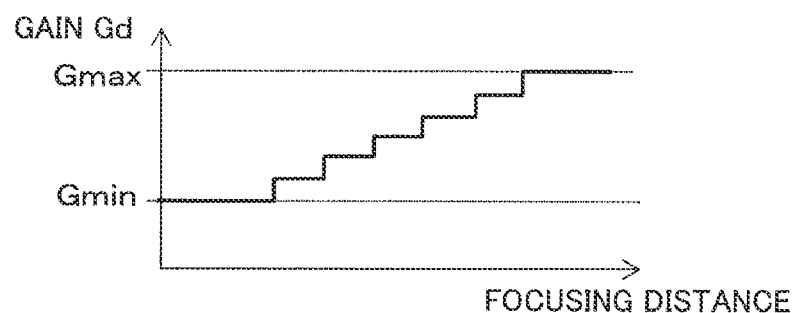

The controller 135 acquires the focusing distance in the same manner as in step S30, and calculates a gain Gd based on the focusing distance (S31). FIG. 12B illustrates a relationship for obtaining the gain Gd from the focusing distance. In the example in FIG. 12B, within the predetermined maximum value Gmax and minimum value Gmin of the gain, the gain Gd increases as the focusing distance increases. Thus, the farther the focusing subject is from the digital camera 100, the larger the gain becomes during the sound collection. Thus, the sound can be more emphasized for the distant subject.

The controller 135 compares the sound collection gain Gh according to the calculated horizontal angle of view with the sound collection gain Gd according to the focusing distance, and sets a larger gain of the two gains Gh and Gd as a sound collection gain G (S32). Thus, the sound collection gain G can be calculated so that the sound of the subject is emphasized in line with the intention of the user who shoots, for example, at a telephoto horizontal angle of view or a long focusing distance.

The controller 135 determines whether or not the calculated sound collection gain G and the determined sound collection area are respectively the same over a predetermined number of times in the past (e.g., five times) (S33). For example, the sound collection gain G is stored together with the above management information each time when the sound collection gain G is calculated, within a predetermined number of times of the execution cycle for steps S1 to S5 in FIG. 4. When the controller 135 determines that the sound collection gain G and the sound collection area of the predetermined number of times in the past are respectively the same (YES in S33), the process proceeds to step S34.

The controller 135 sets the sound collection target determined by the selection processing of the sound collection target in step S3, the sound collection area determined by the determination processing of the sound collection area in step S4, and the sound collection gain G calculated in step S32, as sound collection parameters in the audio processing engine 170 (S34). The audio processing engine 170 causes the beam former 172 and the gain adjuster 174 to achieve a sound collection area and a sound collection gain corresponding to the set sound collection parameters.

After setting the sound collection parameters (S34), the controller 135 ends the processing of sound collection control with face recognition (S5). When determining that the sound collection gain G and the sound collection area of the predetermined number of times in the past are not respectively the same (NO in S33), the controller 135 ends the processing in step S5 in FIG. 4 without performing the processing in step S34. Thereafter, the processing from step S1 onward in FIG. 4 is repeated.

According to the above processing, the calculated sound collection gain, the sound collection target and sound collection area determined based on face recognition are set as sound collection parameters. In this way, it is possible to achieve a sound collection area and a sound collection gain that make it easier to clearly collect the sound of the subject of the sound collection target including the AF target.

The execution order of steps S30 and S31 is not limited to the order of the present flowchart. For example, the gain Gh may be calculated in step S30 after the gain Gd is calculated in step S31, or steps S30 and S31 may be performed in parallel.

In addition, according to the above step S33, the processing of setting the sound collection parameters (S34) is performed only when the sound collection area and the sound collection gain G do not change a predetermined number of times (e.g., 5 times). Thus, it is possible to prevent the sound collection area and the sound collection gain G from being changed excessively frequently due to the movement or the like of the subject. This enables the digital camera 100 to achieve the sound collection control with face recognition (S5) accurately in line with the user's intention.

(2) Step S6 in FIG. 4

Details of the sound collection control without face recognition (S6) in step S6 in FIG. 4 will be described with reference to FIG. 13.

Figure 13:
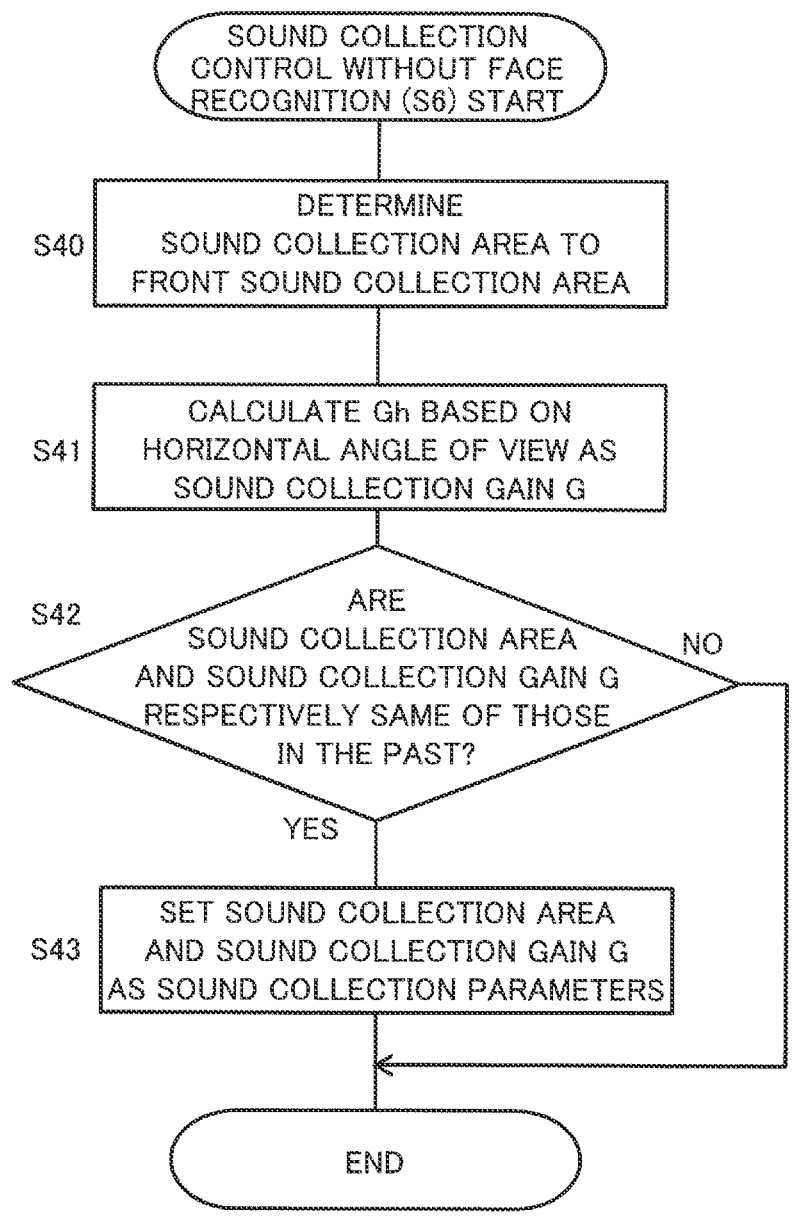
FIG. 13 is a flowchart illustrating a sound collection control without face recognition (S6 in FIG. 4) of the digital camera 100.

FIG. 13 is a flowchart illustrating the sound collection control without face recognition (S6). When there is no face region of the AF target in step S2 in FIG. 4, such as no face region being detected (NO in S2), each process shown in the flowchart in FIG. 13 is performed by the controller 135 of the digital camera 100, for example.

At first, the controller 135 determines the sound collection area to, for example, the front sound collection area 44 (S40).

Next, the controller 135 calculates the gain Gh based on the horizontal angle of view and sets the gain Gh as the sound collection gain G (S41) in the same manner as in step S30. Furthermore, similarly to step S33, the controller 135 determines whether the calculated sound collection gain G and the determined sound collection area are respectively the same over a predetermined number of times in the past. (S42).

When determining that the sound collection gain G and the sound collection area of the predetermined number of times in the past are respectively the same (YES in S42), the controller 135 sets the sound collection area and the sound collection gain G as the sound collection parameters (S43) and ends the sound collection control without face recognition (S6). When determining that the sound collection gain G and the sound collection area of the predetermined number of times in the past are not respectively the same (NO in S42), the controller 135 ends the processing in step S6 in FIG. 4 without performing the processing in step S43. After the end of step S6, the processing from step S1 onward is repeated.

According to the above processing, even when there is no face region of the AF target, a wide range of sound in front of the digital camera 100 is collected. In addition, as the horizontal angle of view becomes smaller due to zooming or the like, the sound collection gain is enlarged. Thus, it is possible to make it easier to clearly collect the sound in a range to be captured.

An entire sound collection area may be defined and determined as the sound collection area in step S40 according to the operation mode of the digital camera 100. The entire sound collection area has an angular range of 360° around the digital camera 100. In this case, for example, only the entire sound collection area may be set as the sound collection parameter.

1-3. Effects and the Like

In the present embodiment, the controller 135 determines a subject as the sound collection target for the audio signal (S3), according to a size of the subject region detected by the face recognizer 122, that is, the face widths W1, W2, and W3 as the sizes of the face regions R1 to R3. Then the controller 135 controls the sound collection area so as to include the subject determined as the sound collection target (S4 to S5). Thus, according to a size of the subject region, it is possible to achieve selection of a subject which is a sound collection target and a subject which is not a sound collection target from a plurality of subjects, for example.

In the present embodiment, the face recognizer 122 detects the human face regions R1 to R3 in the image data as the subject regions. The subject region is not limited to the human face region, and an animal face region may be detected, for example. In addition, the size of the subject region is not limited to the face width, and may be, for example, the width in the Y-axis direction of the face regions R1 to R3 or the area of the face regions R1 to R3 in the captured image Im.

In the present embodiment, the controller 135 controls the imaging operation of the image sensor 115 so as to focus on the subject of the AF target (main subject). It should be noted that the main subject is not limited to the AF target. The digital camera 100 may execute various operations such as exposure control instead of or in addition to the focusing operation on the main subject.

Second Embodiment

Hereinafter, the second embodiment will be described with reference to the drawings. In the first embodiment, the digital camera 100 that selects and determines sound collection targets during shooting a moving image or the like is described. In the second embodiment, a digital camera 100 that visualizes information regarding the determined sound collection target to the user during the operation as in the first embodiment will be described.

Hereinafter, description of the same configuration and operation as those of the digital camera 100 according to the first embodiment will be appropriately omitted, and the digital camera 100 according to the present embodiment will be described.

2-1. Outline

An outline of the operation of displaying various kinds of information by the digital camera 100 according to the present embodiment will be described with reference to FIG. 14.

Figure 14:
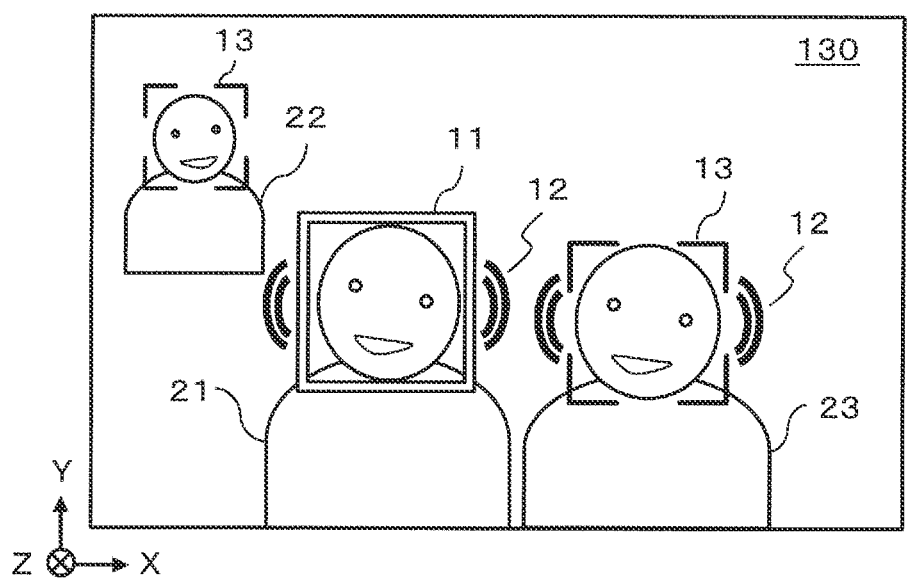
FIG. 14 is a diagram showing a display example of a digital camera 100 according to a second embodiment.

FIG. 14 shows a display example of the digital camera 100 according to the present embodiment. The display example in FIG. 14 shows an example displayed in real time on the display monitor 130 when the digital camera 100 determines the sound collection target as illustrated in FIG. 5B. In the present display example, the digital camera 100 displays a sound collection icon 12 indicating a subject of the sound collection target, in addition to the AF frame 11 showing the subject of the AF target and a detection frame 13 showing a detected subject other than the AF target, on the display monitor 130 in a manner of being superimposed on the captured image Im.

Using the sound collection icon 12 in combination with the AF frame 11 and the detection frame 13, the digital camera 100 of the present embodiment visualizes to the user whether a main subject such as an AF target and a detected subject other than the main subject are determined as the AF target and/or the sound collection target.

For example, in the display example in FIG. 14, since the subject corresponding to the face region R1 (60) in the example in FIG. 5B is determined as the AF target and the sound collection target, the digital camera 100 displays the AF frame 11 and the sound collection icon 12 on the person 21. In addition, since the subject corresponding to the face region R3 in the example in FIG. 5B is determined as the sound collection target other than the AF target, the digital camera 100 displays the detection frame 13 and the sound collection icon 12 on the person 23. Furthermore, by displaying the detection frame 13 without the sound collection icon 12, the digital camera 100 visualizes to the user that the digital camera 100 has determined that in the example in FIG. 5B the subject corresponding to the face region R2 other than the AF target is not the sound collection target.

According to the digital camera 100 of the present embodiment, the user can check whether a detected subject is an AF target by the displayed frame which is either the AF frame 11 or the detection frame 13. The user can also check whether the detected subject is a sound collection target by the presence or absence of the sound collection icon 12. The combination of the AF frame 11 and the sound collection icon 12 is an example of first identification information in the present embodiment. The combination of the detection frame 13 and the sound collection icon 12 is an example of second identification information in the present embodiment. The detection frame 13 is an example of third identification information.

As described above, the digital camera 100 according to the present embodiment performs the display for distinguishing the subject of the determined sound collection target and AF target from the subjects included in the detection information. Thus, the user can grasp the subject of the sound collection target among the subjects detected by the digital camera 100, and can check whether the subject in line with user's intention is determined as the sound collection target, for example. Furthermore, the digital camera 100 of the present embodiment operates so that based on the displayed information, the user can input an operation of adding a subject to the sound collection target or an operation of deleting a subject from the sound collection target.

2-2. Details of Operation

Figure 15:
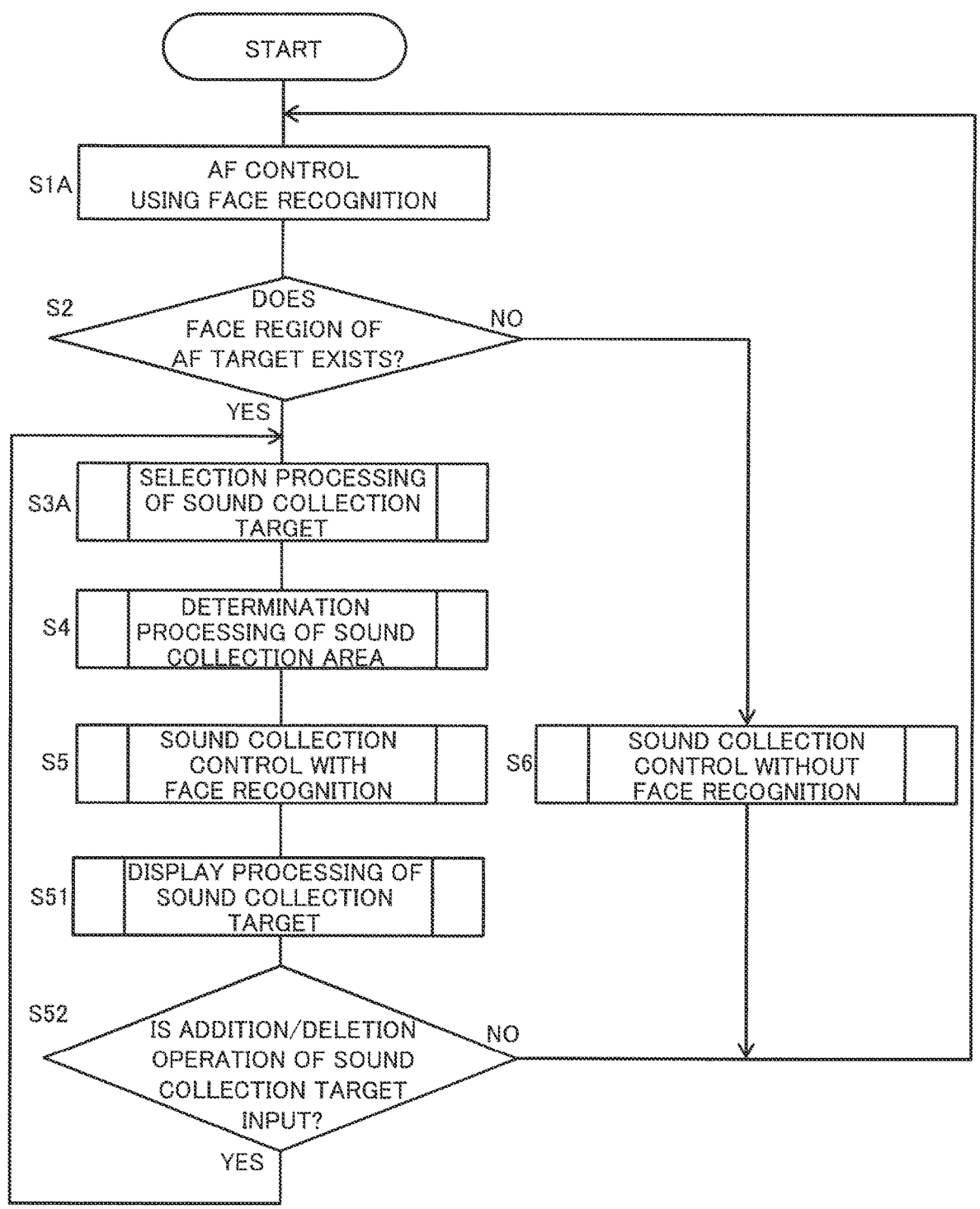
FIG. 15 is a flowchart illustrating an operation of the digital camera 100 according to the second embodiment.

FIG. 15 is a flowchart illustrating the operation of the digital camera 100 according to the present embodiment. Similarly to the flowchart in FIG. 4 in the first embodiment, each process shown in the flowchart in FIG. 15 is executed by the controller 135 of the digital camera 100, for example. The processing in steps S2 and S4 to S6 in FIG. 15 is the same as that of the first embodiment (FIG. 4), and the description thereof will be omitted below.

In the present embodiment, in the AF control by face recognition (S1A) as an example, the controller 135 causes the display monitor 130 to display the AF frame 11 and the detection frame 13 described above, upon determining the AF target based on the detection result by the face recognizer 122 as in step S1 in FIG. 4.

Furthermore, the selection processing of the sound collection target of the present embodiment (S3A) includes processing that reflects the user operation described above, in a similar processing as in step S3 in FIG. 4. Details of the selection processing of the sound collection target (S3A) in the present embodiment will be described later.

In the present embodiment, the controller 135 performs sound collection control with face recognition (S5), and then performs processing of displaying information related to a sound collection target (S51), for example. In the display example in FIG. 14, in addition to the AF frame 11 and the detection frame 13 displayed in step S1A, the controller 135 causes the display monitor 130 to display the sound collection icon 12 on the subject of the sound collection target determined in step S3A (S51). The details of the display processing of the sound collection target (S51) will be described later.

Next, the controller 135 determines whether or not a user operation of adding a subject to the determined sound collection target or a user operation of deleting a subject from the sound collection target is input in the operation member 150 (S52). This addition or deletion operation of the sound collection target is preset as a touch operation for designating a position on the touch panel of the operation member 150 arranged so as to overlap the display screen of the display monitor 130, for example (see FIGS. 16A to 16C and 17A to 17C). When the above user operation is input, the controller 135 associates information indicating a subject, such as a face region including the designated position, with information indicating either the addition operation or the deletion operation of the sound collection target, to hold input information in the buffer memory 125, for example.

When determining that the addition or deletion operation of the sound collection target is input (YES in S52), the controller 135 executes from step S3A onward again. In the selection processing of the sound collection target (S3A) at this time, the input information input in step S52 is referred to.

Figure 16A:
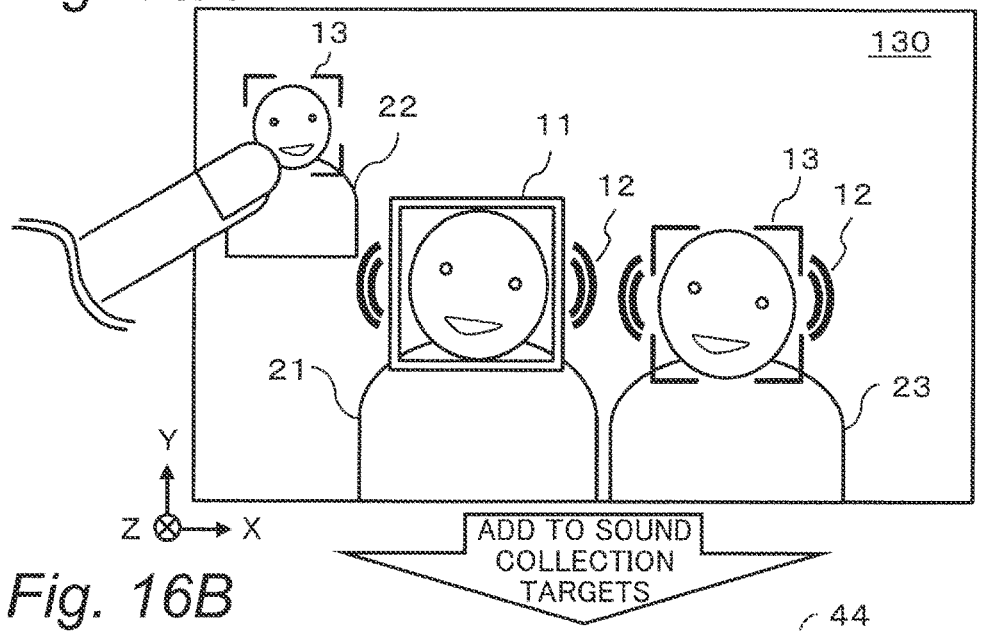
FIGS. 16A to 16C are diagrams showing an operation example corresponding to an addition operation of a sound collection target of the digital camera 100 according to the second embodiment.
Figure 16B:
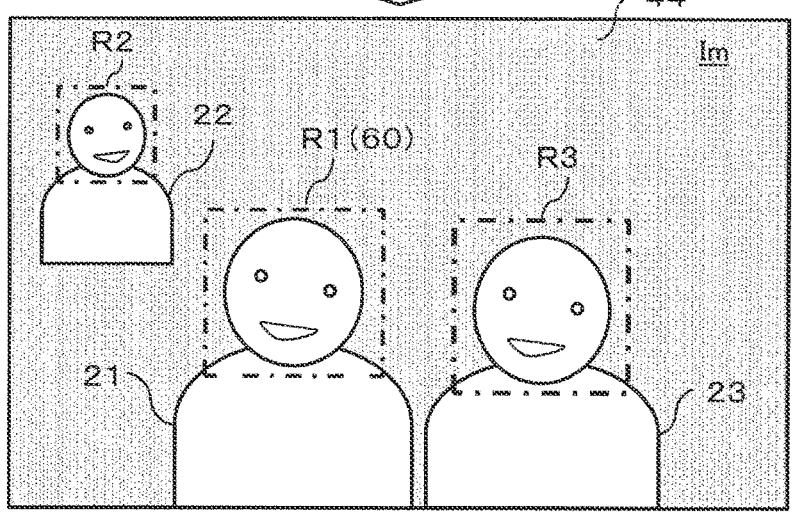
Figure 16C:
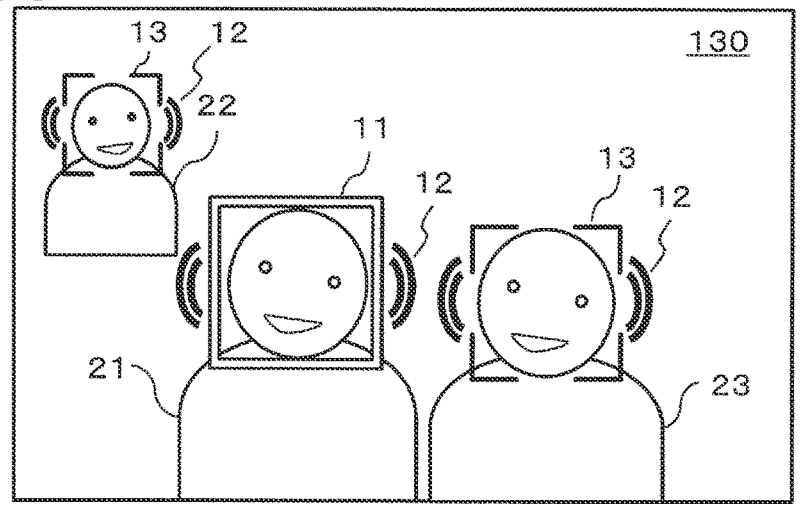

FIGS. 16A to 16C are diagrams showing an operation example corresponding to the addition operation of a sound collection target. FIG. 16A shows an example in which the user performs the addition operation of a sound collection target on the display example in FIG. 14. FIG. 16B illustrates a state in which the sound collection area is changed from that in FIG. 5B according to the addition operation in FIG. 16A. FIG. 16C shows a display example of the display monitor 130 corresponding to the state in FIG. 16B.

In the operation example in FIGS. 16A to 16C, the user performs a touch operation on the detection frame 13 of the person 22 on which the sound collection icon 12 is not displayed. In response to the addition operation, the controller 135 of the digital camera 100 determines the subject of the face region R2 as a sound collection target (S3A), and determines the sound collection area to the front sound collection area 44 including the face region R2 (S4). Thereafter, as shown in FIG. 16C, the controller 135 displays the sound collection icon 12 on the subject determined as the sound collection target (S51).

Figure 17A:
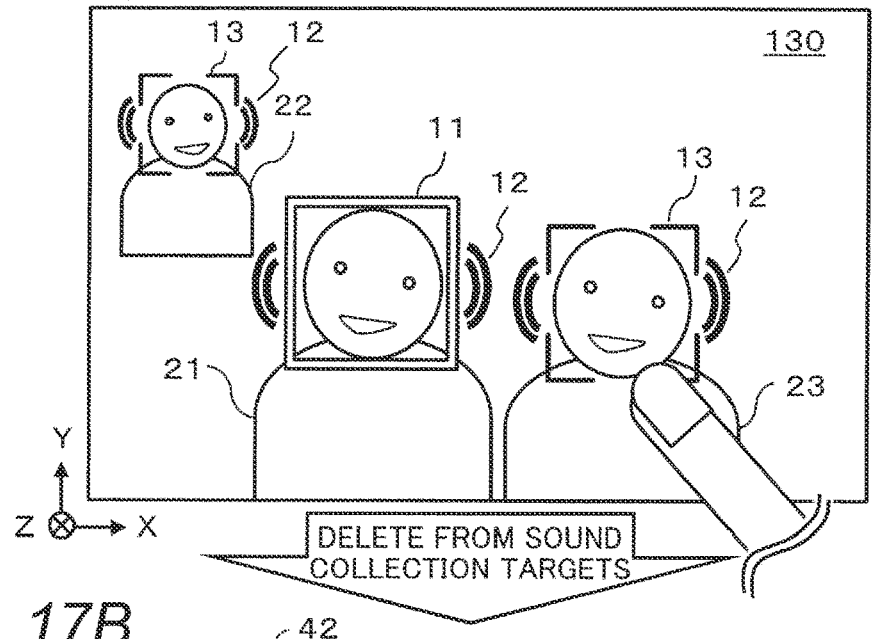
FIGS. 17A to 17C are diagrams showing an operation example corresponding to a deletion operation of a sound collection target of the digital camera 100 according to the second embodiment.
Figure 17B:
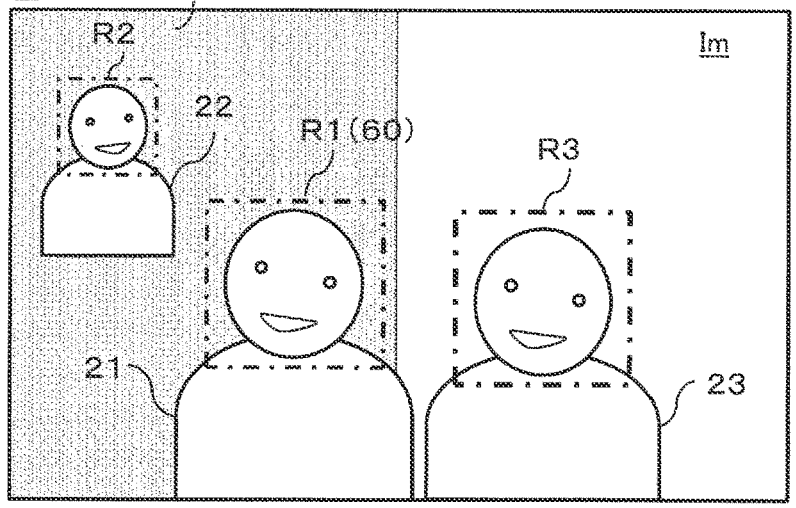
Figure 17C:
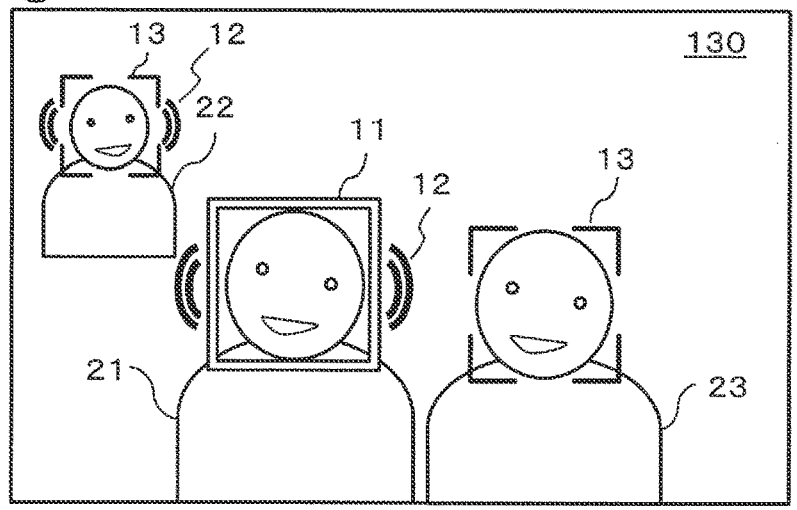

FIGS. 17A to 17C are diagrams showing an operation example corresponding to the deletion operation of a sound collection target. FIG. 17A shows an example in which the user performs the deletion operation of a sound collection target after the addition operation in FIGS. 16A to 16C is input. FIG. 17B illustrates a state in which the sound collection area is changed from that in FIG. 16B according to the deletion operation in FIG. 17A. FIG. 17C shows a display example of the display monitor 130 corresponding to the state in FIG. 17B.

In the operation example in FIGS. 17A to 17C, the user performs a touch operation on the detection frame 13 of the person 23 on which the sound collection icon 12 is displayed. In response to the deletion operation, the controller 135 determines the subject of the face region R3 as not a sound collection target (S3A), and determines the sound collection area to the left half sound collection area 42 not including the face region R3 (S4). Thereafter, as shown in FIG. 17C, the controller 135 does not display the sound collection icon 12 on the subject determined as not the sound collection target (S51).

Referring back to FIG. 15, when the operation of adding or deleting the subject of the sound collection target is not particularly input (NO in S52), the controller 135 repeats the processing from step S1A onward.

According to the above processing, the digital camera 100 of the present embodiment displays the AF frame 11 or the detection frame 13 on the detected subject (S1A), determines the sound collection target (S3A), and performs display for distinguishing whether or not the detected subject is the sound collection target (S51). The digital camera 100 enables to receive the addition or deletion operation of a sound collection target by the user based on these displays (S52).

Thus, the digital camera 100 of the present embodiment can add a user-specified subject to the sound collection target as shown in FIGS. 16A to 16C, or can delete a user-specified subject from the sound collection target as shown in FIGS. 17A to 17C, in response to the user operation that is based on the display of whether the subject is the sound collection target. Thus, the digital camera 100 can change to a sound collection target in line with the user's intention even when the determined sound collection target is different from the user's intention.

The processing in steps S5 and S51 in FIG. 15 may be performed in an order different from that described above. For example, the processing in step S5 may be performed after the processing in step S51 is performed. In addition, the input of the user operation in step S52 is not limited to the touch operation, and may be performed by, a cursor key or a joystick of the operation member 150, for example.

Figure 18:
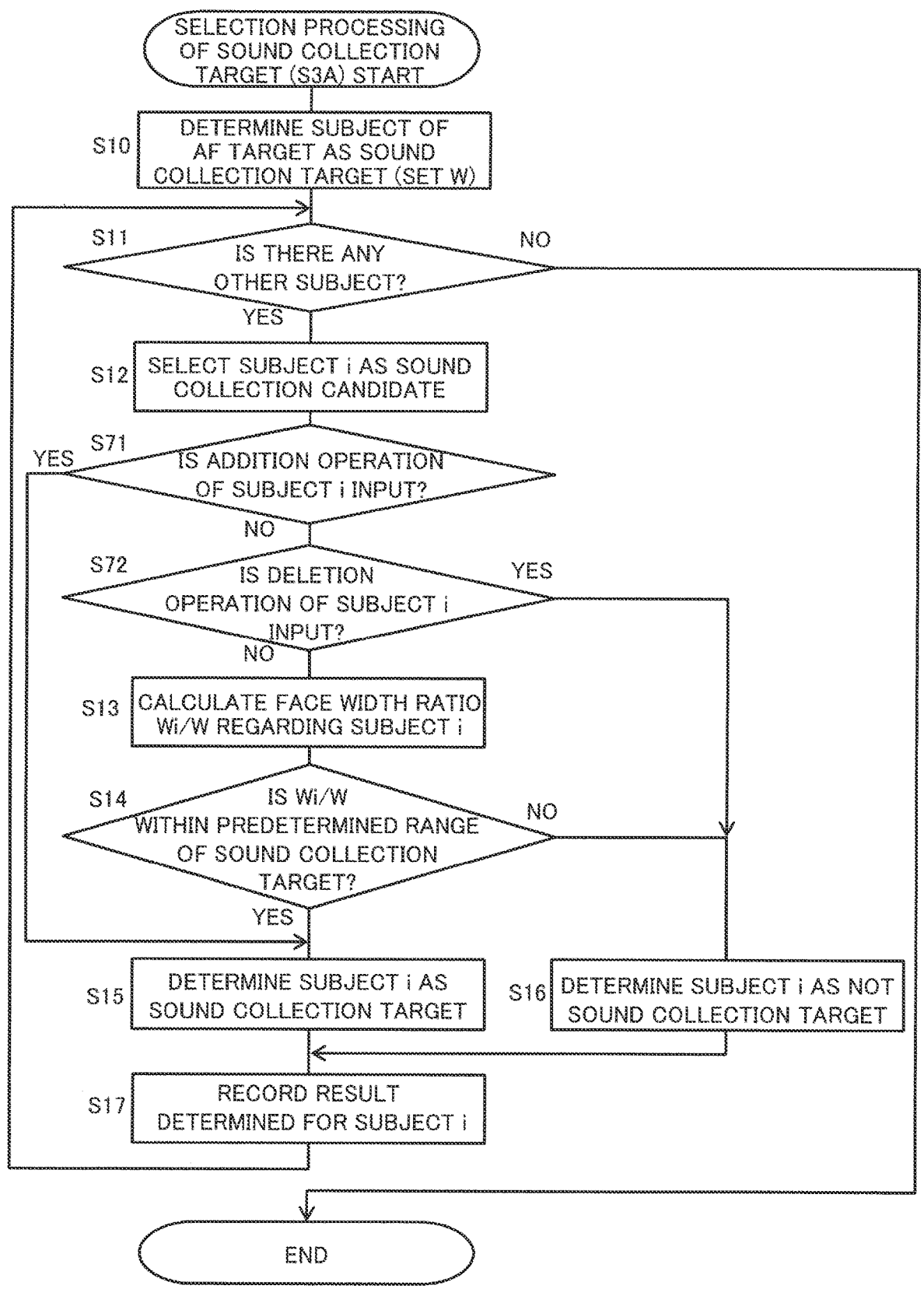
FIG. 18 is a flowchart illustrating selection processing of a sound collection target (S3A in FIG. 15) of the digital camera 100 according to the second embodiment.

2-2-1. Selection Processing of Sound Collection Target According to Second Embodiment FIG. 18 is a flowchart illustrating the selection processing of the sound collection target (S3A in FIG. 15) of the digital camera 100 of the present embodiment. In the following, an example of a case where the addition or deletion operation of a sound collection target is input in step S52 in FIG. 15 (YES in S52) will be described. In the present embodiment, in addition to the processing shown in the flowchart in FIG. 6 in the first embodiment, processing of determining a sound collection target is performed according to the operation input in step S52. The processing in steps S10 to S12 and S13 to S17 in FIG. 18 is the same as those in the first embodiment (FIG. 6), and the description thereof will be omitted below.

When selecting the subject i of the sound collection candidate (S12), as in the flowchart in FIG. 6, the controller 135 determines whether an addition operation of a sound collection target on the subject i is input (S71). Specifically, referring to the input information stored in the buffer memory 125 in step S52 in FIG. 15, the controller 135 determines whether the subject i is recorded in the input information in association with the addition operation.

When there is no addition operation of the subject i (NO in S71), the controller 135 determines whether there is a deletion operation of a sound collection target on the subject i (S72). On this processing, referring to the input information similarly to the determination in step S71 the controller 135 determines whether the subject i is recorded in the input information in association with the deletion operation.

When there is no deletion operation of the subject i (NO in S72), the controller 135 performs the processing from step S13 onward as in the flowchart in FIG. 6. In this case, as in the first embodiment, whether the subject i is to be set as the sound collection target is determined according to the comparison of the sizes of the face regions.

On the other hand, when determining that there is an addition operation of the subject i (YES in S71), the controller 135 determines the subject i as the sound collection target without particularly performing the processing in steps S13 to S14 (S15). In the example in FIGS. 16A to 16C, when the face region R2 of the person 22 is selected as the subject i of the sound collection candidate (S12), the controller 135 proceeds to YES in step S71 to determine the subject i as the sound collection target regardless of the size of the face region R2.

In addition, when determining that there is a deletion operation of the subject i (YES in S72), the controller 135 determines the subject i as not the sound collection target without particularly performing the processing in steps S13 to S14 (S16). In the example in FIGS. 17A to 17C, when the face region R3 of the person 23 is selected as the subject i of the sound collection candidate (S12), the controller 135 proceeds to YES in step S72 to determine the subject i as not the sound collection target regardless of the size of the face region R3 (S16).

In the above example, the digital camera 100 that determines whether the addition operation and the deletion operation of the sound collection target are input (S71, S72) is described, but the present embodiment is not limited to this. For example, the digital camera 100 may be operable to receive an input of only either the addition operation or the deletion operation in step S52 in FIG. 15 and may perform only either steps S71 or S72 in FIG. 18 depending on each operation.

2-2-2. Display Processing of Sound Collection Target

Details of the display processing of the sound collection target (S51) in FIG. 15 will be described with reference to FIG. 19.

Figure 19:
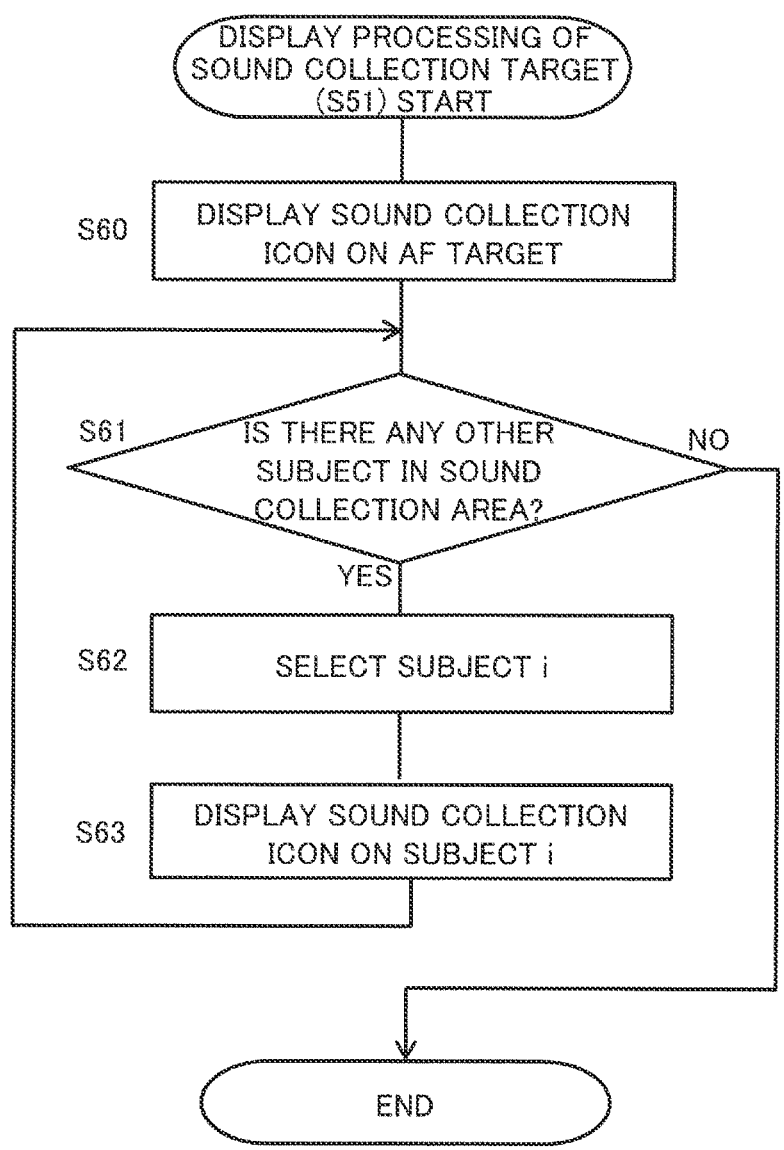
FIG. 19 is a flowchart illustrating display processing of a sound collection target (S51 in FIG. 15) of the digital camera 100 according to the second embodiment.

FIG. 19 is a flowchart illustrating the display processing of the sound collection target (S51). In the following, in the display example in FIG. 14 corresponding to the example in FIG. 5B, the operation of displaying the sound collection target will be described.

At first, the controller 135 causes the display monitor 130 to display the sound collection icon 12 on the subject of the AF target (S60), according to determining the subject of the AF target as the sound collection target (see S10 in FIG. 6) in the selection processing of the sound collection target (S3A in FIG. 15). In the example in FIG. 5B, the display monitor 130 displays the sound collection icon 12 together with the AF frame 11 on the subject corresponding to the face region 60 of the AF target as shown in FIG. 14.

Next, among the subjects included in the sound collection area determined in step S4 in FIG. 4, the controller 135 determines whether there is a subject in addition to the AF target (S61). Specifically, the controller 135 compares the positional information in the detection information by the face recognizer 122 with the position on the captured image Im corresponding to the direction and angle range of the determined sound collection area, and thereby determines whether the sound collection area includes a subject in addition to the AF target.

When there are subjects included in the sound collection area in addition to the AF target (YES in S61), the controller 135 selects one subject i from the subjects (S62). In the example in FIG. 5B, since the front center sound collection area 41 includes the face region R3 in addition to the face region 60 of the AF target, the controller 135 selects the face region R3.

Subsequently, the controller 135 displays the sound collection icon 12 on the selected subject i (S63). Thus, in the example in FIG. 5B, the display monitor 130 displays the sound collection icon 12 together with the detection frame 13 on the person 23 corresponding to the face region R3, as shown in FIG. 14.

Thereafter, when displaying the sound collection icon 12 on the selected subject i (S63), the controller 135 determines whether there is a subject included in the sound collection area other than the selected subject (S61). When there is another subject (YES in S61), the controller 135 performs the processing from step S42 onward again.

When there is no other subject included in the sound collection area (NO in S41), the controller 135 ends the display processing of the sound collection target (S51) and proceeds to step S52 in FIG. 15.

According to the above-described processing, displaying the sound collection icon 12 on the subject included in the sound collection area allows the user to grasp the subject of the sound collection target. This makes it easy for the user to check whether the subject whose sound is intended to be collected is the sound collection target in addition to the main subject such as the AF target.

In the flowchart illustrated in FIG. 19, the controller 135 selects the subject i from the subjects included in the sound collection area (S61 to 62), but the present disclosure is not limited to this. For example, the subject i may be selected from the sound collection targets determined in step S3A in FIG. 15, or may be selected from all the subjects included in the detection information. In addition, when step S51 is executed from a second time onward in the flowchart in FIG. 15, step S61 may be omitted or another determination criterion may be used, for example.

2-3. Effects and the Like

As described above, the digital camera 100 according to the above-described embodiments includes a display monitor 130 (display), an image sensor 115, an A/D converter 165 for a microphone (audio input device), a face recognizer 122 (detector), and a controller 135. The display monitor 130 displays information. The image sensor 115 is configured to capture an image of a subject to generate image data. The A/D converter 165 for a microphone is configured to input audio to generate an audio signal indicating sound to be collected during image capturing with the image sensor 115. The face recognizer 122 detects face regions R1, R2, and R3 in the image data generated by the image sensor 115 each as an example of the subject region corresponding to the subject. The controller 135 determines a subject of the AF target (main subject) and a sound collection target for the audio signal, according to the face regions R1 to R3 detected by the face recognizer 122. When the face recognizer 122 detects a plurality of face regions R1 to R3, the controller 135 controls the display monitor 130 to display an AF frame 11 and a sound collection icon 12 (first identification information) and a detection frame 13 and a sound collection icon 12 (second identification information) distinguishably from each other (S1A, S51). The first identification information indicates a subject which is the AF target and is the sound collection target. The second identification information indicates a subject which is different from the main subject and is the sound collection target.

The digital camera 100 described above displays a subject which is the main subject and is the sound collection target and a subject which is different from the main subject and is the sound collection target distinguishably from each other. Thus, it can be visualized to the user whether there is a subject which is the sound collection target other than the main subject. This makes it possible for the user to easily check the subject whose sound is intended to be collected.

In the second embodiment, the controller 135 is configured to cause the display monitor 130 to display the detection frame 13 (third identification information) indicating the subject not being the sound collection target, in distinction from the first identification information and the second identification information (S1A). This allows the user to check, on the display monitor 130, even a subject other than the sound collection target among the detected subjects.

In the present embodiment, the first identification information shows that the AF frame 11 (first identification indicator) identifies the main subject and the sound collection icon 12 (second identification indicator) identifies the sound collection target. The first identification indicator shows whether or not a subject is the subject of the AF target (main subject). The second identification indicator shows whether or not a subject is the sound collection target. The second identification information shows that the AF frame 11 does not identify the subject of the AF target and the sound collection icon 12 identifies the sound collection target. The third identification information shows that the AF frame 11 does not identify the AF target and the sound collection icon 12 does not identify the sound collection target (see FIG. 14).

The digital camera 100 described above performs display to identify a subject from two viewpoints of whether or not the subject is the AF target with the AF frame 11 and whether or not the subject is the sound collection target with the sound collection icon 12. This allows visualization easy for the user to understand.

In the present embodiment, the digital camera 100 further includes an operation member 150 for inputting at least one of a deletion operation and an addition operation based on the information displayed on the display monitor 130. The deletion operation is a user operation for deleting a specific subject from the sound collection target. The addition operation is a user operation for adding a specific subject to the sound collection target. Thus, even when the subject of the determined sound collection target is different from the user's intention, the user can input an operation of selecting a desired subject, for example. This allows the digital camera 100 to add the subject to the sound collection target or to delete the subject from the sound collection target in line with the user's intention.

OTHER EMBODIMENTS

As described above, each embodiment described above is described as an example of the technique disclosed in the present application. However, the technique in the present disclosure is not limited to this, and can also be applied to embodiments in which changes, substitutions, additions, omissions, and the like are made as appropriate. In addition, it is also possible to combine each component described in each embodiment described above to form a new embodiment.

Figure 20:
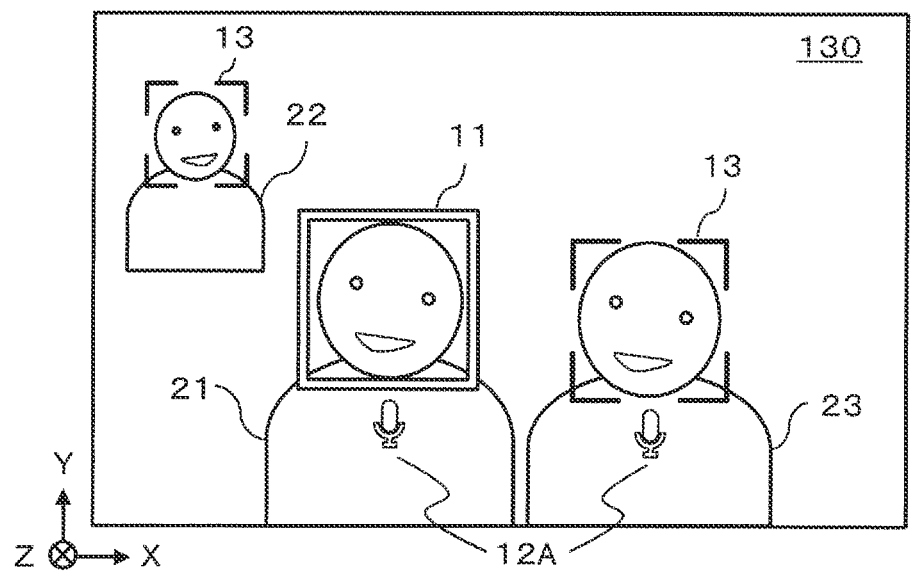
FIG. 20 is a diagram showing a first modification of the second embodiment.
Figure 21:
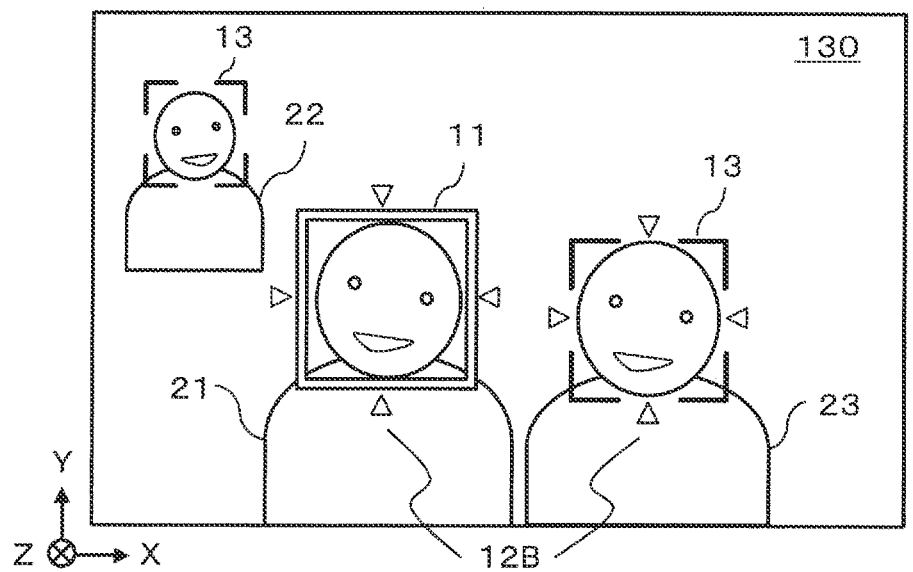
FIG. 21 is a diagram showing a second modification of the second embodiment.
Figure 22:
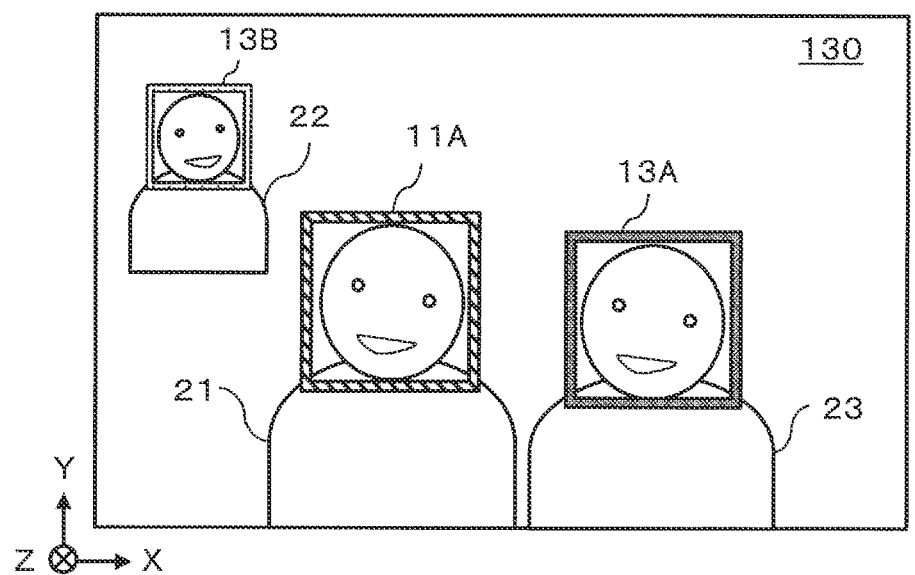
FIG. 22 is a diagram showing a third modification of the second embodiment.

In the second embodiment, the digital camera 100 displays the AF frame 11, the sound collection icon 12, and the detection frame 13 illustrated in FIG. 14 (S1A and S51 in FIG. 15). The digital camera 100 of the present embodiment may visualize information regarding the determined sound collection target to the user in a display mode different from that of the second embodiment. FIGS. 20, 21, and 22 are diagrams showing a first modification, a second modification, and a third modification of the second embodiment, respectively.

FIGS. 20 and 21 respectively show examples of the display monitor 130 displaying sound collection icons 12A and 12B different from those of the second embodiment. FIG. 20 illustrates the sound collection icon 12A that imitates a microphone. FIG. 21 illustrates the sound collection icon 12B represented by frame display. The sound collection icon 12B is not particularly limited to the example in FIG. 21, and may be, for example, a rectangular frame display. In addition, the digital camera 100 of the present embodiment may receive, through the operation member 150, a user operation for selecting a sound collection icon to be displayed from various sound collection icons such as the sound collection icons 12A and 12B, for example.

In the second embodiment, the first identification information, the second identification information, and the third identification information identify whether or not a subject is the main subject in the presence or absence of the AF frame 11, and identify whether or not a subject is the sound collection target in the presence or absence of the sound collection icon 12. In the present embodiment, the first to third identification information are not particularly limited to these, and may be, three types of frame display, for example. FIG. 22 illustrates three types of frame display in the present embodiment. The example in FIG. 22 illustrates a frame display 11A showing the subject of the AF target and of the sound collection target, a frame display 13A showing the subject of other than the AF target and of the sound collection target, and a frame display 13B showing the subject other than the sound collection target. Thus, the display of a subject of the AF target and the display of the sound collection target are integrally performed, and the display of a subject of other than the AF target and the display of the sound collection target are also integrally performed.

In the first and second embodiments, in the flowchart in FIG. 4, the operation example of performing the sound collection control with or without face recognition (S5 or S6) using the microphone 161 built in the digital camera 100 is described. The digital camera 100 of the present embodiment may include an external microphone (hereinafter referred to as "microphone 161a") instead of the built-in microphone 161. The microphone 161a includes microphone devices outside the digital camera 100, and includes three or more microphone devices. In the present embodiment, on the microphone 161a, the controller 135 holds information regarding the arrangement of microphone devices in the buffer memory 125 or the like in advance, whereby the controller 135 can perform step S5 or S6 similarly to that of the first embodiment. Also in this case, it is possible to easily obtain the sound of the subject clearly according to the sound collection target and/or the sound collection area determined as in the first embodiment.

In addition, in the first and second embodiments, in the flowchart in FIG. 10, the operation example in which the gain Gh is calculated based on the horizontal angle of view that corresponds to the image capturing range of the digital camera 100 (S30) is described. The horizontal angle of view in this case is the same as the horizontal angle of view Gh used for the determination of the front center sound collection area (S20) in the flowchart in FIG. 8. In the present embodiment, a horizontal angle of view different from the horizontal angle of view h in step S20 may be used for calculating the gain Gh. For example, an angle range corresponding to the width in the X-axis direction including all subjects of the sound collection targets on the captured image is set as the horizontal angle of view in step S30. Thus, the gain Gh can be calculated according to the angle of view in which the sound collection target appears, so that a voice of a distant subject can be more clearly collected.

In addition, in the first and second embodiments, the face recognizer 122 detects a human face. In the present embodiment, the face recognizer 122 may detect a face of an animal, for example. Animal faces are various in size depending on the type of the animal. Even in this case, for example, enlarging the predetermined range for selecting the sound collection target (see S14) allows the sound collection target to be selected as in the first embodiment. Furthermore, the face recognizer 122 may detect a face for each type of animals and set the predetermined range in step S14 according to the type.

In addition, in the first and second embodiments, the digital camera 100 including the face recognizer 122 is described. In the present embodiment, the face recognizer 122 may be provided in an external server. In this case, via the communication module 155, the digital camera 100 may transmit the image data on the captured image to the external server and receive the detection information on the processing result by the face recognizer 122 from the external server. In this digital camera 100, the communication module 155 functions as a detector.

In addition, in the first and second embodiments, the digital camera 100 including the optical system 110 and the lens driver 112 is illustrated. The imaging apparatus of the present embodiment may not include the optical system 110 and the lens driver 112, and may be, for example, an interchangeable lens type camera.

In addition, in the first and second embodiments, the digital camera is described as an example of the imaging apparatus, but the present disclosure is not limited to this. The imaging apparatus of the present disclosure may be an electronic apparatus having an image capturing function (e.g., a video camera, a smartphone, a tablet terminal, or the like).

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiments are for illustrating the technique in the present disclosure, various changes, substitutions, additions, omissions, and the like can be made within the scope of the claims or the equivalent thereof.

The present disclosure can be applied to an imaging apparatus that captures an image while acquiring sound.

The invention claimed is:
1. An imaging apparatus comprising:
a display configured to display information;
an image sensor configured to capture an image of a subject to generate image data;
an audio input device configured to input audio to generate an audio signal indicating sound to be collected during image capturing with the image sensor;
a detector configured to detect a subject region which corresponds to the subject in the image data;
a controller configured to determine a main subject being a target of autofocus control and a sound collection target for the audio signal, according to a subject region detected by the detector;
wherein when the detector detects a plurality of subject regions, the controller controls the display to display first identification information and second identification information distinguishably from each other, the first identification information indicating a subject which is the main subject as the target of autofocus control and is the sound collection target, and the second identification information indicating a subject which is different from the main subject and is the sound collection target.

2. The imaging apparatus according to claim 1, wherein the controller is configured to cause the display to display third identification information distinguishably from the first identification information and the second identification information, the third identification information indicating a subject which is not the sound collection target.

3. The imaging apparatus according to claim 2, wherein the first identification information shows that a first identification indicator identifies the main subject and a second identification indicator identifies the sound collection target, the first identification indicator showing whether or not a subject is the main subject, and the second identification indicator showing whether or not a subject is the sound collection target,
wherein the second identification information shows that the first identification indicator does not identify the main object and the second identification indicator identifies the sound collection target, and
wherein the third identification information shows that the first identification indicator does not identify the main object and the second identification indicator does not identify the sound collection target.

4. The imaging apparatus according to claim 3, further comprising an operation member configured to input at least one of a deletion operation and an addition operation, the deletion operation being a user operation for deleting a specific subject from the sound collection target based on information displayed on the display, and the addition operation being a user operation for adding a specific subject to the sound collection target based on information displayed on the display.

5. The imaging apparatus according to claim 3, wherein the controller is configured to
determine a subject to be the sound collection target according to a size of the subject region, and
control a sound collection area where a sound from the subject is collected for the audio signal so as to include the subject determined as the sound collection target.

6. The imaging apparatus according to claim 3, wherein the detector is configured to detect a human face region as the subject region in the image data.

7. The imaging apparatus according to claim 3, wherein the controller is configured to control an image capturing operation of the image sensor so as to focus on the main subject.

8. The imaging apparatus according to claim 2, further comprising an operation member configured to input at least one of a deletion operation and an addition operation, the deletion operation being a user operation for deleting a specific subject from the sound collection target based on information displayed on the display, and the addition operation being a user operation for adding a specific subject to the sound collection target based on information displayed on the display.

9. The imaging apparatus according to claim 2, wherein the controller is configured to
determine a subject to be the sound collection target according to a size of the subject region, and
control a sound collection area where a sound from the subject is collected for the audio signal so as to include the subject determined as the sound collection target.

10. The imaging apparatus according to claim 2, wherein the detector is configured to detect a human face region as the subject region in the image data.

11. The imaging apparatus according to claim 2, wherein the controller is configured to control an image capturing operation of the image sensor so as to focus on the main subject.

12. The imaging apparatus according to claim 1, further comprising an operation member configured to input at least one of a deletion operation and an addition operation, the deletion operation being a user operation for deleting a specific subject from the sound collection target based on information displayed on the display, and the addition operation being a user operation for adding a specific subject to the sound collection target based on information displayed on the display.

13. The imaging apparatus according to claim 1, wherein the controller is configured to
determine a subject to be the sound collection target according to a size of the subject region, and
control a sound collection area where a sound from the subject is collected for the audio signal so as to include the subject determined as the sound collection target.

14. The imaging apparatus according to claim 1, wherein the detector is configured to detect a human face region as the subject region in the image data.

15. The imaging apparatus according to claim 1, wherein the controller is configured to control an image capturing operation of the image sensor so as to focus on the main subject.

16. An imaging apparatus comprising:
a display configured to display information;
an image sensor configured to capture an image of a subject to generate image data;
an audio input device configured to input audio to generate an audio signal indicating sound to be collected during image capturing with the image sensor;
a detector configured to detect a subject region which corresponds to the subject in the image data;
a controller configured to determine a main subject and a subject not to be a sound collection target for the audio signal, according to a subject region detected by the detector;
wherein when the detector detects a plurality of subject regions, the controller controls the display to display the image and to additionally display first identification information and third identification information distinguishably from each other, the first identification information showing a subject which is the main subject and is the sound collection target, and the third identification information showing a subject which is different from the main subject and is not to be the sound collection target.

17. The imaging apparatus according to claim 16, further comprising an operation member configured to input at least one of a deletion operation and an addition operation, the deletion operation being a user operation for deleting a specific subject from the sound collection target based on information displayed on the display, and the addition operation being a user operation for adding a specific subject to the sound collection target based on information displayed on the display.

18. An imaging apparatus comprising:
a display configured to display information;
an image sensor configured to capture an image of a subject to generate image data;
an audio input device configured to input audio to generate an audio signal indicating sound to be collected during image capturing with the image sensor;
a detector configured to detect a subject region which corresponds to the subject in the image data;
a controller configured to determine a main subject, a sound collection target for the audio signal, and a subject not to be a sound collection target for the audio signal, according to a subject region detected by the detector;
wherein when the detector detects a plurality of subject regions, the controller controls the display to display the image and to additionally display information for each of and for distinguishing a first subject, a second subject and a third subject from each other, the first subject being the main subject and being the sound collection target, the second subject being different from the main subject and being the sound collection target, and the third subject being different from the main subject and not to be the sound collection target.

19. The imaging apparatus according to claim 18, further comprising an operation member configured to input at least one of a deletion operation and an addition operation, the deletion operation being a user operation for deleting a specific subject from the sound collection target based on information displayed on the display, and the addition operation being a user operation for adding a specific subject to the sound collection target based on information displayed on the display.

* * * * *